United States Patent
Benfield et al.

(10) Patent No.: US 6,877,066 B2
(45) Date of Patent: Apr. 5, 2005

(54) METHOD AND SYSTEM FOR ADAPTIVE CACHING IN A NETWORK MANAGEMENT FRAMEWORK USING SKELETON CACHES

(75) Inventors: Jason Benfield, Austin, TX (US); Oliver Yehung Hsu, Austin, TX (US); Lorin Evan Ullmann, Austin, TX (US); Julianne Yarsa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 09/895,086

(22) Filed: Jun. 29, 2001

(65) Prior Publication Data

US 2003/0037206 A1 Feb. 20, 2003

(51) Int. Cl.[7] .............................................. G06F 12/08
(52) U.S. Cl. ....................................... 711/118; 707/101
(58) Field of Search ........................ 707/2, 101, 103 R, 707/103 Y, 205, 103; 709/316; 711/118, 170, 171, 172; 719/316

(56) References Cited

U.S. PATENT DOCUMENTS

| | | | | |
|---|---|---|---|---|
| 6,061,690 A | * | 5/2000 | Nori et al. ............... | 707/103 R |
| 6,128,623 A | * | 10/2000 | Mattis et al. ........... | 707/103 R |
| 6,609,186 B1 | * | 8/2003 | Veres et al. ................ | 711/171 |

* cited by examiner

Primary Examiner—Gary Portka
(74) Attorney, Agent, or Firm—Jeffrey S. LaBaw; Joseph R. Burwell

(57) ABSTRACT

A method, system, apparatus, and computer program product is presented for management of a distributed data processing system. A network management framework dynamically adapts database operations so as to maximize system performance. A skeletonization mechanism is presented in which some objects are merely represented in a database cache as a skeleton object. A skeleton object holds only a fraction of an object's full complement of data; the skeleton object remains associated with its complete object, also termed its corresponding full object or non-skeleton object, which remains stored within its original location within a database. Skeletonized data can be updated on an as-needed or on-demand basis or when otherwise convenient; at that time, a skeleton handler can detect when a request is made for the object, retrieve the remaining data from persistent storage, and then mark the cached object as being a full object or non-skeleton object.

37 Claims, 12 Drawing Sheets

METHOD AND SYSTEM FOR ADAPTIVE CACHING IN A NETWORK MANAGEMENT FRAMEWORK USING SKELETON CACHES

BACKGROUND OF THE INVENTION

1. Field of the Invention

The present invention relates to an improved data processing system and, in particular, to a method and system for multiple computer or process coordinating. Still more particularly, the present invention provides a method and system for network management.

2. Description of Related Art

Technology expenditures have become a significant portion of operating costs for most enterprises, and businesses are constantly seeking ways to reduce information technology (IT) costs. This has given rise to an increasing number of outsourcing service providers, each promising, often contractually, to deliver reliable service while offloading the costly burdens of staffing, procuring, and maintaining an IT organization. While most service providers started as network pipe providers, they are moving into server outsourcing, application hosting, and desktop management. For those enterprises that do not outsource, they are demanding more accountability from their IT organizations as well as demanding that IT is integrated into their business goals. In both cases, "service level agreements" have been employed to contractually guarantee service delivery between an IT organization and its customers. As a result, IT teams now require management solutions that focus on and support "business processes" and "service delivery" rather than just disk space monitoring and network pings.

IT solutions now require end-to-end management that includes network connectivity, server maintenance, and application management in order to succeed. The focus of IT organizations has turned to ensuring overall service delivery and not just the "towers" of network, server, desktop, and application. Management systems must fulfill two broad goals: a flexible approach that allows rapid deployment and configuration of new services for the customer; and an ability to support rapid delivery of the management tools themselves. A successful management solution fits into a heterogeneous environment, provides openness with which it can knit together management tools and other types of applications, and a consistent approach to managing all of the IT assets.

With all of these requirements, a successful management approach will also require attention to the needs of the staff within the IT organization to accomplish these goals: the ability of an IT team to deploy an appropriate set of management tasks to match the delegated responsibilities of the IT staff; the ability of an IT team to navigate the relationships and effects of all of their technology assets, including networks, middleware, and applications; the ability of an IT team to define their roles and responsibilities consistently and securely across the various management tasks; the ability of an IT team to define groups of customers and their services consistently across the various management tasks; and the ability of an IT team to address, partition, and consistently reach the managed devices.

Many service providers have stated the need to be able to scale their capabilities to manage millions of devices. When one considers the number of customers in a home consumer network as well as pervasive devices, such as smart mobile phones, these numbers are quickly realized. Significant bottlenecks appear when typical IT solutions attempt to support more than several thousand devices.

Given such network spaces, a management system must be very resistant to failure so that service attributes, such as response time, uptime, and throughput, are delivered in accordance with guarantees in a service level agreement. In addition, a service provider may attempt to support many customers within a single network management system. The service provider's profit margins may materialize from the ability to bill usage of a common management system to multiple customers.

On the other hand, the service provider must be able to support contractual agreements on an individual basis. Service attributes, such as response time, uptime, and throughput, must be determinable for each customer. In order to do so, a network management system must provide a suite of network management tools that is able to perform device monitoring and discovery for each customer's network while integrating these abilities across a shared network backbone to gather the network management information into the service provider's distributed data processing system.

Hence, there is a direct relationship between the ability of a management system to provide network monitoring and discovery functionality and the ability of a service provider using the management system to serve multiple customers using a single management system. Preferably, the management system can replicate services, detect faults within a service, restart services, and reassign work to a replicated service. By implementing a common set of interfaces across all of their services, each service developer gains the benefits of system robustness. A well-designed, component-oriented, highly distributed system can easily accept a variety of services on a common infrastructure with built-in fault-tolerance and levels of service.

Distributed data processing systems with thousands of nodes are known in the prior art, but a highly distributed system of more than a million devices presents particular challenges. For example, meeting quality-of-service objectives in a highly distributed system can be quite difficult. While a service provider's management system should have an infrastructure that can accurately measure and report the level of service available for any resource throughout the system, the management infrastructure should also be able to tune its operations so that management activities do not degrade the performance of the system as seen by the customers of the service provider. In particular, the management system should be able to adjust its bandwidth and memory requirements so as to maximize the performance of the system. However, within a system that performs network management tasks for a million devices or more, a tremendous amount of computational resources throughout the system could be consumed for administrative duties, making it particularly difficult to dynamically tune the resource requirements of the network management infrastructure.

Therefore, it would be advantageous to provide a method and system that adapts the administrative database operations so as to minimize the impact on system performance that is caused by the system management operations. It would be particularly advantageous if performance adjustments occurred dynamically in accordance with the current needs of the system management infrastructure.

SUMMARY OF THE INVENTION

A method, system, apparatus, and computer program product is presented for management of a distributed data processing system. A network management framework adapts management database operations so as to minimize the impact on system performance that is caused by the system management operations. In particular, performance adjustments occurred dynamically in accordance with the current needs of the system management infrastructure. A database is emulated in memory, and applications that consume data from the database are presented with an interface such that the application would determine that there is little overhead for accessing the database. In order to expedite a database access, some objects are pre-fetched into a cache.

A skeletonization mechanism is presented in which some objects are merely represented in the cache as a skeleton object. A skeleton object holds only a fraction of an object's full complement of data; the skeleton object remains associated with its complete object, also termed its corresponding full object or non-skeleton object, which remains stored within its original location within a database.

When it is determined that a network management framework component may need access to objects within a database, some full objects may be pre-fetched into a cache while other full objects may be merely represented within the cache by their corresponding skeleton objects. Hence, some of the full objects that could have been pre-fetched into the cache are represented within the cache only by their corresponding skeleton objects. A cache comprising both full objects and skeleton objects may be termed a skeleton cache or a skeletonized cache.

In a given implementation of a network management framework, the types of objects that are used by the network management framework components will dictate the types of corresponding skeleton objects. In order for the network management framework to be as flexible as possible, each type of skeleton object is structured in accordance with a skeleton definition associated with the skeleton object; the skeleton definition allows a skeleton handler, i.e. a manager component for the operations on skeleton objects, to determine which attributes within an object should be represented within its corresponding skeleton object. The attributes of an object that are not fully valued within the skeleton object are termed skeleton attributes.

In addition, again so that the network management framework can be as flexible as possible, the present invention employs skeleton policies. A skeleton policy defines when a full object should be skeletonized, i.e. when an object should be retrieved from persistent storage into memory, e.g., a cache, as a skeleton object rather than as a copy of the full object. Various network management framework components refer to the skeleton policy such that the skeleton policy directs the operation of the network management framework components with respect to a particular object, i.e. the network management framework components determine when to skeletonize an object based on information within the skeleton policy.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention provides a methodology for managing a distributed data processing system. The manner in which the system management is performed is described further below in more detail after the description of the preferred embodiment of the distributed computing environment in which the present invention operates.

Figure 1:
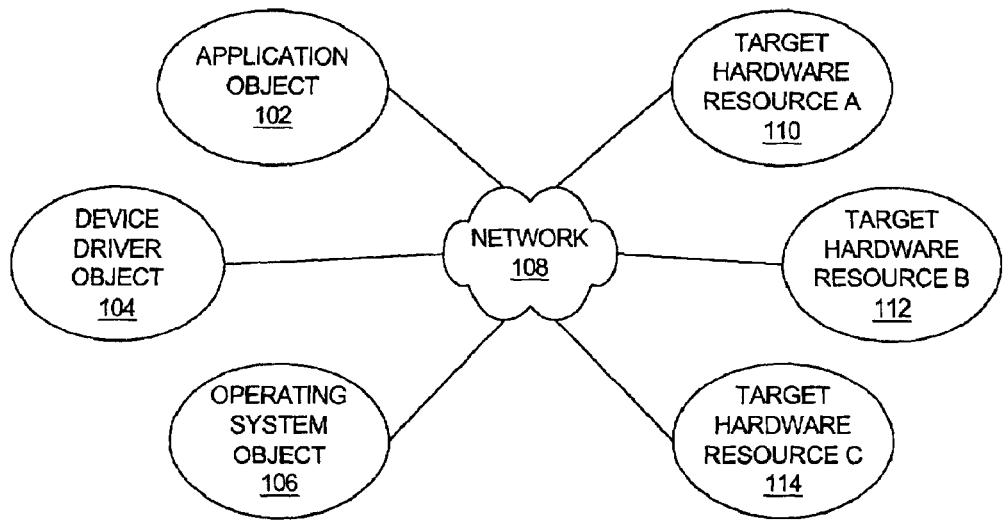
FIG. 1 is a diagram depicting a known logical configuration of software and hardware resources.

With reference now to FIG. 1, a diagram depicts a known logical configuration of software and hardware resources. In this example, the software is organized in an object-oriented system. Application object 102, device driver object 104, and operating system object 106 communicate across network 108 with other objects and with hardware resources 110–114.

In general, the objects require some type of processing, input/output, or storage capability from the hardware resources. The objects may execute on the same device to which the hardware resource is connected, or the objects may be physically dispersed throughout a distributed computing environment. The objects request access to the hardware resource in a variety of manners, e.g. operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 2A:
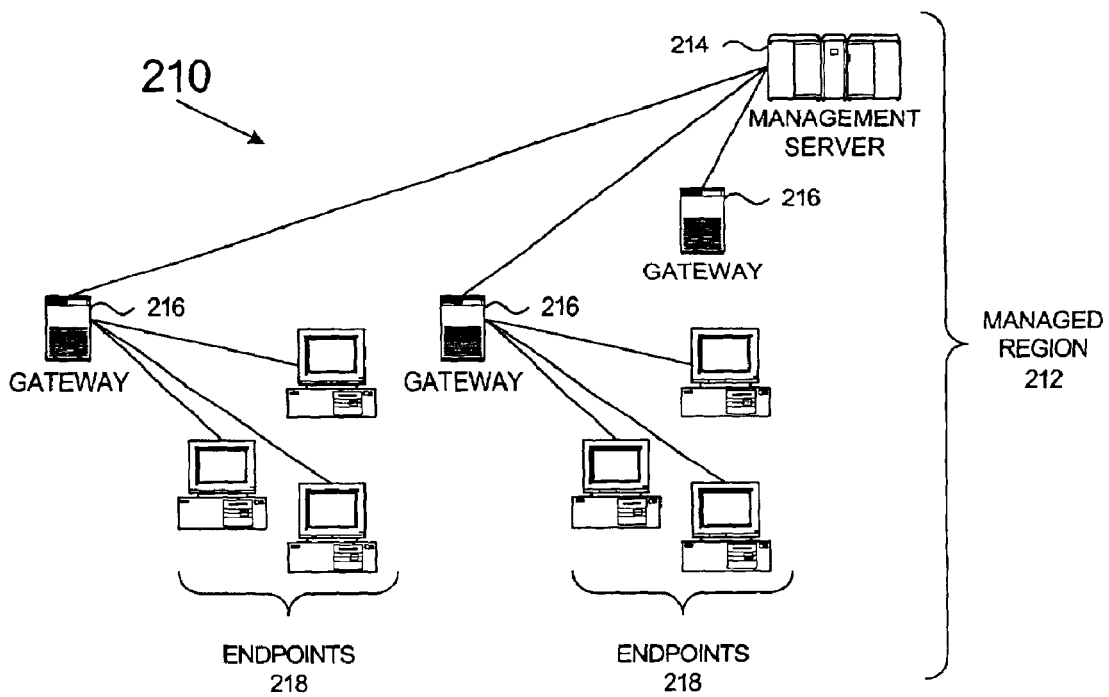
FIG. 2A is simplified diagram illustrating a large distributed computing enterprise environment in which the present invention is implemented.

With reference now to FIG. 2A, the present invention is preferably implemented in a large distributed computer environment 210 comprising up to thousands of "nodes". The nodes will typically be geographically dispersed and the overall environment is "managed" in a distributed manner. Preferably, the managed environment is logically broken down into a series of loosely connected managed regions (MRs) 212, each with its own management server 214 for managing local resources with the managed region. The network typically will include other servers (not shown) for carrying out other distributed network functions. These include name servers, security servers, file servers, thread servers, time servers and the like. Multiple servers 214 coordinate activities across the enterprise and permit remote management and operation. Each server 214 serves a number of gateway machines 216, each of which in turn support a plurality of endpoints/terminal nodes 218. The server 214 coordinates all activity within the managed region using a terminal node manager at server 214.

Figure 2B:
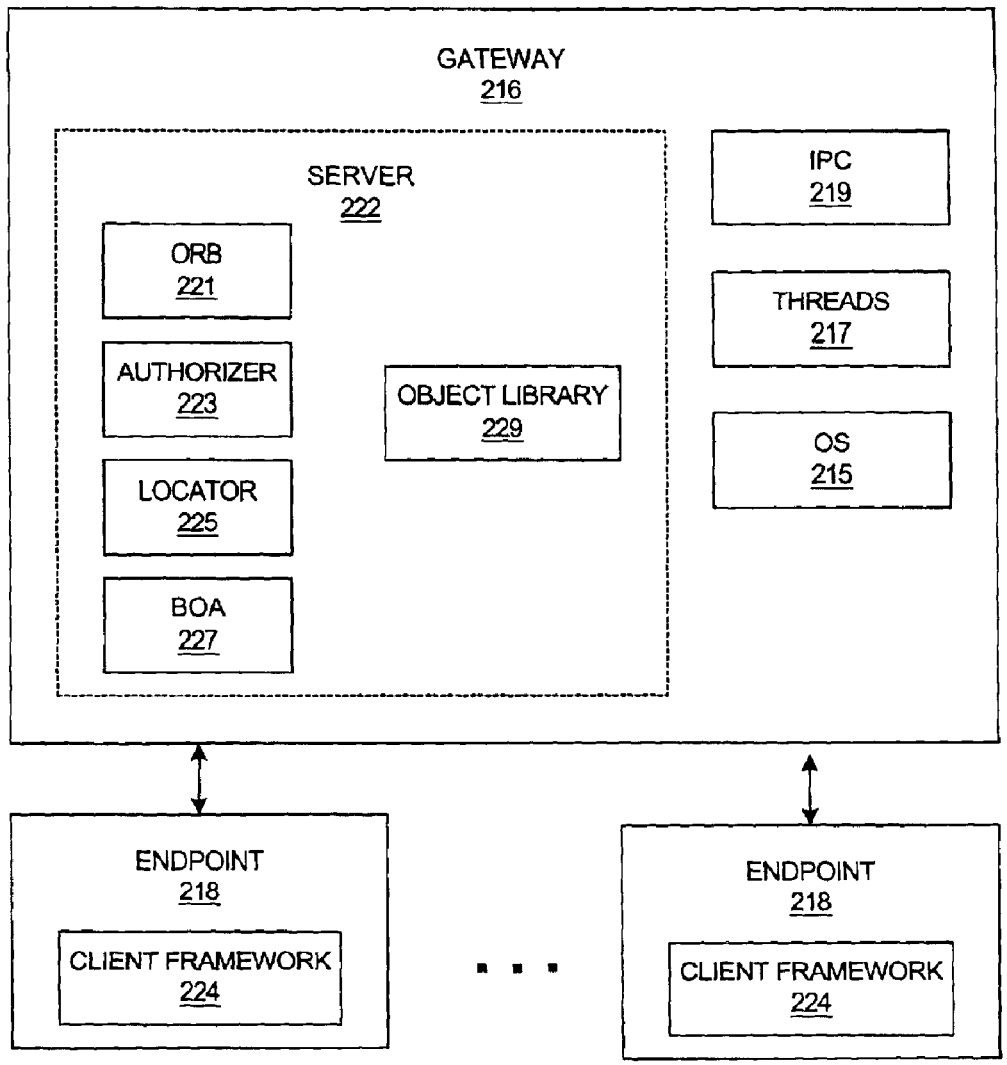
FIG. 2B is a block diagram of a preferred system management framework illustrating how the framework functionality is distributed across the gateway and its endpoints within a managed region.

With reference now to FIG. 2B, each gateway machine 216 runs a server component 222 of a system management framework. The server component 222 is a multi-threaded runtime process that comprises several components: an object request broker (ORB) 221, an authorization service 223, object location service 225 and basic object adapter (BOA) 227. Server component 222 also includes an object library 229. Preferably, ORB 221 runs continuously, separate from the operating system, and it communicates with both server and client processes through separate stubs and skeletons via an interprocess communication (IPC) facility 219. In particular, a secure remote procedure call (RPC) is used to invoke operations on remote objects. Gateway machine 216 also includes operating system 215 and thread mechanism 217.

The system management framework, also termed distributed kernel services (DKS), includes a client component 224 supported on each of the endpoint machines 218. The client component 224 is a low cost, low maintenance application suite that is preferably dataless in the sense that system management data is not cached or stored there in a persistent manner. Implementation of the management framework in this "client-server" manner has significant advantages over the prior art, and it facilitates the connectivity of personal computers into the managed environment. It should be noted, however, that an endpoint may also have an ORB for remote object-oriented operations within the distributed environment, as explained in more detail further below.

Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like. In a preferred implementation, the object-oriented framework includes a Java runtime environment for well-known advantages, such as platform independence and standardized interfaces. Both gateways and endpoints operate portions of the system management tasks through cooperation between the client and server portions of the distributed kernel services.

In a large enterprise, such as the system that is illustrated in FIG. 2A, there is preferably one server per managed region with some number of gateways. For a workgroup-size installation, e.g., a local area network, a single server-class machine may be used as both a server and a gateway. References herein to a distinct server and one or more gateway(s) should thus not be taken by way of limitation as these elements may be combined into a single platform. For intermediate size installations, the managed region grows breadth-wise, with additional gateways then being used to balance the load of the endpoints.

The server is the top-level authority over all gateways and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

As noted above, there are one or more gateways per managed region. Preferably, a gateway is a fully managed node that has been configured to operate as a gateway. In certain circumstances, though, a gateway may be regarded as an endpoint. A gateway always has a network interface card (NIC), so a gateway is also always an endpoint. A gateway usually uses itself as the first seed during a discovery process. Initially, a gateway does not have any information about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2C:
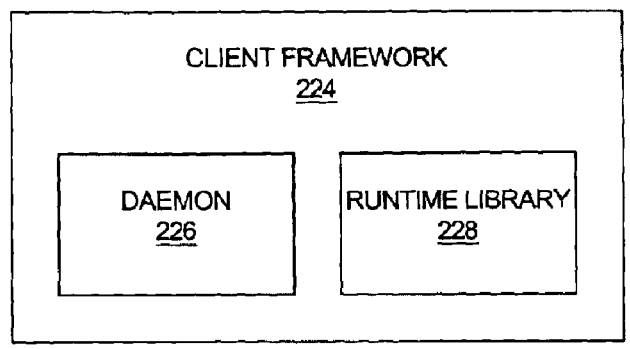
FIG. 2C is a block diagram of the elements that comprise the low cost framework (LCF) client component of the system management framework.

As also discussed above, the endpoint is a machine running the system management framework client component, which is referred to herein as a management agent. The management agent has two main parts as illustrated in FIG. 2C: daemon 226 and application runtime library 228. Daemon 226 is responsible for endpoint login and for spawning application endpoint executables. Once an executable is spawned, daemon 226 has no further interaction with it. Each executable is linked with application runtime library 228, which handles all further communication with the gateway.

Each endpoint is also a computing device. In one preferred embodiment of the invention, most of the endpoints are personal computers, e.g., desktop machines or laptops. In this architecture, the endpoints need not be high powered or complex machines or workstations. An endpoint computer preferably includes a Web browser such as Netscape Navigator or Microsoft Internet Explorer. An endpoint computer thus may be connected to a gateway via the Internet, an intranet, or some other computer network.

Preferably, the client-class framework running on each endpoint is a low-maintenance, low-cost framework that is ready to do management tasks but consumes few machine resources because it is normally in an idle state. Each endpoint may be dataless in the sense that system management data is not stored therein before or after a particular system management task is implemented or carried out.

Figure 2D:
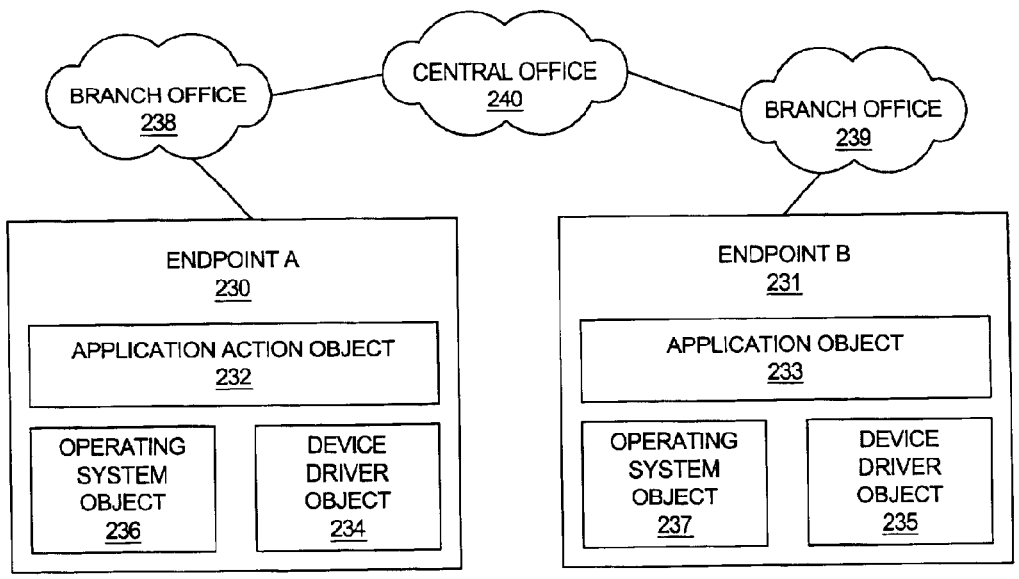
FIG. 2D is a diagram depicting a logical configuration of software objects residing within a hardware network similar to that shown in FIG. 2A.

With reference now to FIG. 2D, a diagram depicts a logical configuration of software objects residing within a hardware network similar to that shown in FIG. 2A. The endpoints in FIG. 2D are similar to the endpoints shown in FIG. 2B. Object-oriented software, similar to the collection of objects shown in FIG. 1, executes on the endpoints. Endpoints 230 and 231 support application action object 232 and application object 233, device driver objects 234–235, and operating system objects 236–237 that communicate across a network with other objects and hardware resources.

Resources can be grouped together by an enterprise into managed regions representing meaningful groups. Overlaid on these regions are domains that divide resources into groups of resources that are managed by gateways. The gateway machines provide access to the resources and also perform routine operations on the resources, such as polling. FIG. 2D shows that endpoints and objects can be grouped into managed regions that represent branch offices 238 and 239 of an enterprise, and certain resources are controlled by central office 240. Neither a branch office nor a central office is necessarily restricted to a single physical location, but each represents some of the hardware resources of the distributed application framework, such as routers, system management servers, endpoints, gateways, and critical applications, such as corporate management Web servers. Different types of gateways can allow access to different types of resources, although a single gateway can serve as a portal to resources of different types.

Figure 2E:
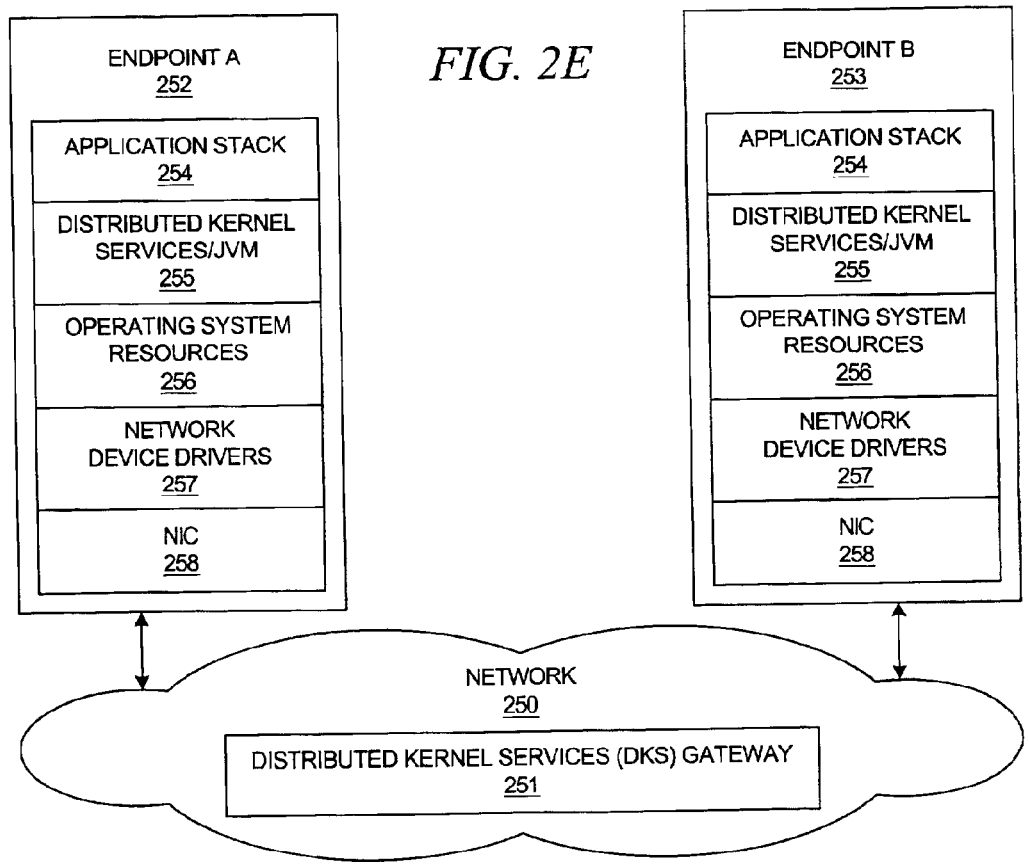
FIG. 2E is a diagram depicting the logical relationships between components within a system management framework that includes two endpoints and a gateway.

With reference now to FIG. 2E, a diagram depicts the logical relationships between components within a system management framework that includes two endpoints and a gateway. FIG. 2E shows more detail of the relationship between components at an endpoint. Network 250 includes gateway 251 and endpoints 252 and 253, which contain similar components, as indicated by the similar reference numerals used in the figure. An endpoint may support a set of applications 254 that use services provided by the distributed kernel services 255, which may rely upon a set of platform-specific operating system resources 256. Operating system resources may include TCP/IP-type resources, SNMP-type resources, and other types of resources. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 2F:
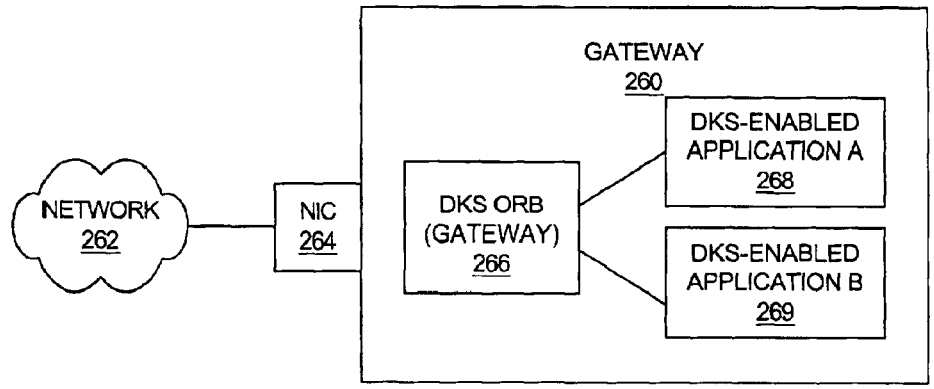
FIG. 2F is a diagram depicting the logical relationships between components within a system management framework that includes a gateway supporting two DKS-enabled applications.

With reference now to FIG. 2F, a diagram depicts the logical relationships between components within a system management framework that includes a gateway supporting two DKS-enabled applications. Gateway 260 communicates with network 262 through NIC 264. Gateway 260 contains ORB 266 that supports DKS-enabled applications 268 and 269. FIG. 2F shows that a gateway can also support applications. In other words, a gateway should not be viewed as merely being a management platform but may also execute other types of applications.

Figure 2G:
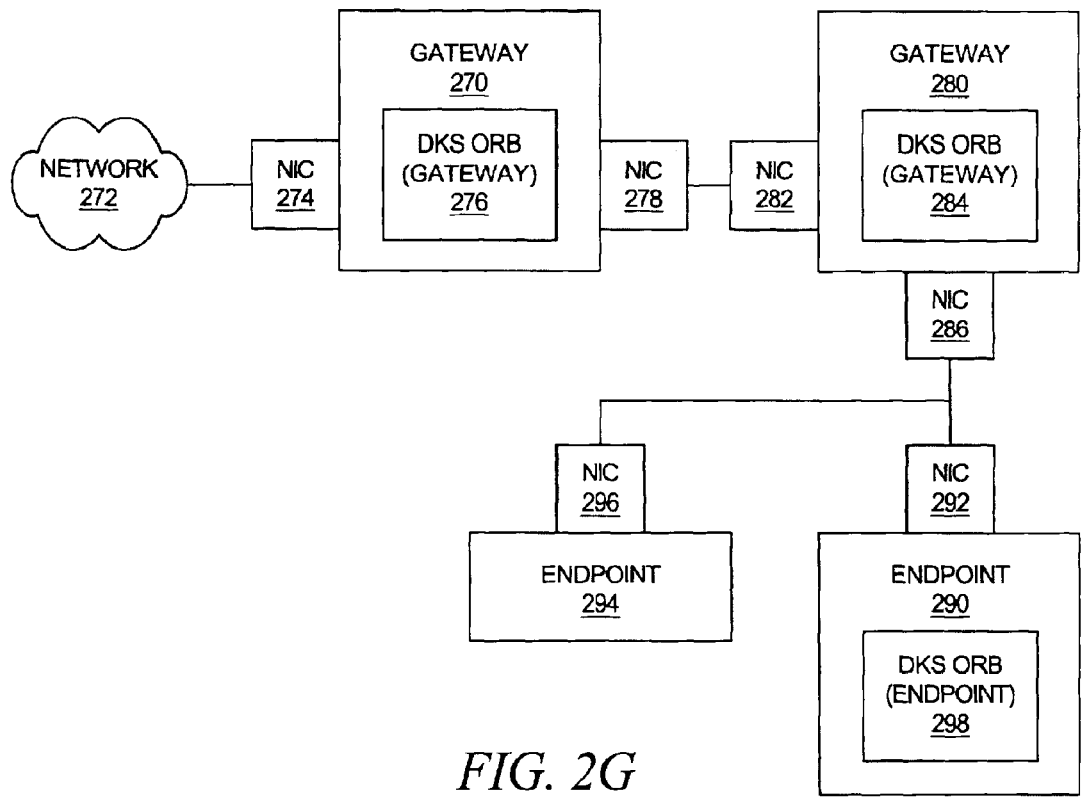
FIG. 2G is a diagram depicting the logical relationships between components within a system management framework that includes two gateways supporting two endpoints.

With reference now to FIG. 2G, a diagram depicts the logical relationships between components within a system management framework that includes two gateways supporting two endpoints. Gateway 270 communicates with network 272 through NIC 274. Gateway 270 contains ORB 276 that may provide a variety of services, as is explained in more detail further below. In this particular example, FIG. 2G shows that a gateway does not necessarily connect with individual endpoints.

Gateway 270 communicates through NIC 278 and network 279 with gateway 280 and its NIC 282. Gateway 280 contains ORB 284 for supporting a set of services. Gateway 280 communicates through NIC 286 and network 287 to endpoint 290 through its NIC 292 and to endpoint 294 through its NIC 296. Endpoint 290 contains ORB 298 while endpoint 294 does not contain an ORB. In this particular example, FIG. 2G also shows that an endpoint does not necessarily contain an ORB. Hence, any use of endpoint 294 as a resource is performed solely through management processes at gateway 280.

FIGS. 2F and 2G also depict the importance of gateways in determining routes/data paths within a highly distributed system for addressing resources within the system and for performing the actual routing of requests for resources. The importance of representing NICs as objects for an object-oriented routing system is described in more detail further below.

As noted previously, the present invention is directed to a methodology for managing a distributed computing environment. A resource is a portion of a computer system's physical units, a portion of a computer system's logical units, or a portion of the computer system's functionality that is identifiable or addressable in some manner to other physical or logical units within the system.

Figure 3:
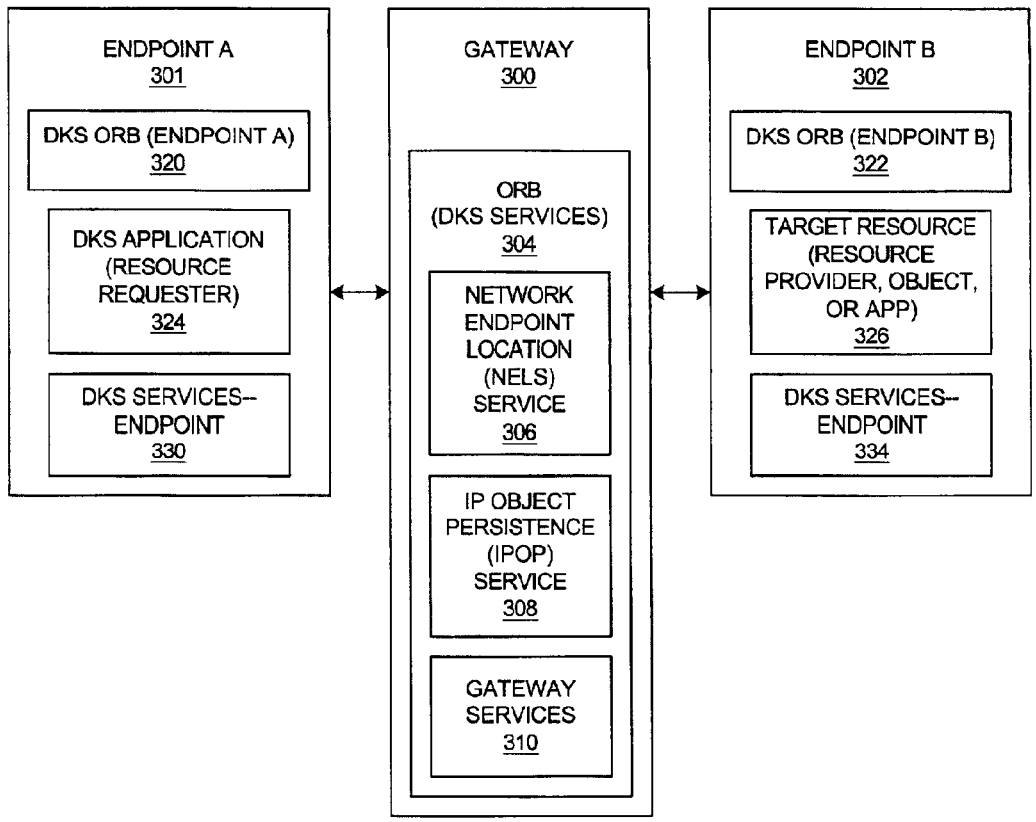
FIG. 3 is a block diagram depicting components within the system management framework that provide resource leasing management functionality within a distributed computing environment such as that shown in FIGS. 2D–2E.

With reference now to FIG. 3, a block diagram depicts components within the system management framework within a distributed computing environment such as that shown in FIGS. 2D-2E. A network contains gateway 300 and endpoints 301 and 302. Gateway 302 runs ORB 304. In general, an ORB can support different services that are configured and run in conjunction with an ORB. In this case, distributed kernel services (DKS) include Network Endpoint Location Service (NELS) 306, IP Object Persistence (IPOP) service 308, and gateway service 310.

The gateway service processes action objects, which are explained in more detail below, and directly communicates with endpoints or agents to perform management operations. The gateway receives events from resources and passes the events to interested parties within the distributed system. The NELS works in combination with action objects and determines which gateway to use to reach a particular resource. A gateway is determined by using the discovery service of the appropriate topology driver, and the gateway location may change due to load balancing or failure of primary gateways.

Other resource level services may include an SNMP (Simple Network Management Protocol) service that provides protocol stacks, polling service, and trap receiver and filtering functions. The SNMP service can be used directly by certain components and applications when higher performance is required or the location independence provided by the gateways and action objects is not desired. A metadata service can also be provided to distribute information concerning the structure of SNMP agents.

The representation of resources within DKS allows for the dynamic management and use of those resources by applications. DKS does not impose any particular representation, but it does provide an object-oriented structure for applications to model resources. The use of object technology allows models to present a unified appearance to management applications and hide the differences among the underlying physical or logical resources. Logical and physical resources can be modeled as separate objects and related to each other using relationship attributes.

By using objects, for example, a system may implement an abstract concept of a router and then use this abstraction within a range of different router hardware. The common portions can be placed into an abstract router class while modeling the important differences in subclasses, including representing a complex system with multiple objects. With an abstracted and encapsulated function, the management applications do not have to handle many details for each managed resource. A router usually has many critical parts, including a routing subsystem, memory buffers, control components, interfaces, and multiple layers of communication protocols. Using multiple objects has the burden of creating multiple object identifiers (OIDs) because each object instance has its own OID. However, a first order object can represent the entire resource and contain references to all of the constituent parts.

Each endpoint may support an object request broker, such as ORBs 320 and 322, for assisting in remote object-oriented operations within the DKS environment. Endpoint 301 contains DKS-enabled application 324 that utilizes object-oriented resources found within the distributed computing environment. Endpoint 302 contains target resource provider object or application 326 that services the requests from DKS-enabled application 324. A set of DKS services 330 and 334 support each particular endpoint.

Applications require some type of insulation from the specifics of the operations of gateways. In the DKS environment, applications create action objects that encapsulate commands which are sent to gateways, and the applications wait for the return of the action object. Action objects contain all of the information necessary to run a command on a resource. The application does not need to know the specific protocol that is used to communicate with the resource. The application is unaware of the location of the gateway because it issues an action object into the system, and the action object itself locates and moves to the correct gateway. The location independence allows the NELS to balance the load between gateways independently of the applications and also allows the gateways to handle resources or endpoints that move or need to be serviced by another gateway.

The communication between a gateway and an action object is asynchronous, and the action objects provide error handling and recovery. If one gateway goes down or becomes overloaded, another gateway is located for executing the action object, and communication is established again with the application from the new gateway. Once the controlling gateway of the selected endpoint has been identified, the action object will transport itself there for further processing of the command or data contained in the action object. If it is within the same ORB, it is a direct transport. If it is within another ORB, then the transport can be accomplished with a "Moveto" command or as a parameter on a method call.

Queuing the action object on the gateway results in a controlled process for the sending and receiving of data from the IP devices. As a general rule, the queued action objects are executed in the order that they arrive at the gateway. The action object may create child action objects if the collection of endpoints contains more than a single ORB ID or gateway ID. The parent action object is responsible for coordinating the completion status of any of its children. The creation of child action objects is transparent to the calling application. A gateway processes incoming action objects, assigns a priority, and performs additional security challenges to prevent rogue action object attacks. The action object is delivered to the gateway that must convert the information in the action object to a form suitable for the agent. The gateway manages multiple concurrent action objects targeted at one or more agents, returning the results of the operation to the calling application as appropriate.

In the preferred embodiment, potentially leasable target resources are Internet protocol (IP) commands, e.g. pings, and Simple Network Management Protocol (SNMP) commands that can be executed against endpoints in a managed region. Referring again to FIGS. 2F and 2G, each NIC at a gateway or an endpoint may be used to address an action object. Each NIC is represented as an object within the IPOP database, which is described in more detail further below.

The Action Object IP (AOIP) Class is a subclass of the Action Object Class. An AOIP object is the primary vehicle that establishes a connection between an application and a designated IP endpoint using a gateway or stand-alone service. In addition, the Action Object SNMP (AOSnmp) Class is also a subclass of the Action Object Class. An AOSnmp object is the primary vehicle that establishes a connection between an application and a designated SNMP endpoint via a gateway or the Gateway Service. However, the present invention is primarily concerned with IP endpoints.

The AOIP class should include the following: a constructor to initialize itself; an interface to the NELS; a mechanism by which the action object can use the ORB to transport itself to the selected gateway; a security check verification of access rights to endpoints; a container for either data or commands to be executed at the gateway; a mechanism by which to pass commands or classes to the appropriate gateway or endpoint for completion; and public methods to facilitate the communication between objects.

The instantiation of an AOIP object creates a logical circuit between an application and the targeted gateway or endpoint. This circuit is persistent until command completion through normal operation or until an exception is thrown. When created, the AOIP object instantiates itself as an object and initializes any internal variables required. An AOIP may be capable of running a command from inception or waiting for a future command. A program that creates an AOIP object must supply the following elements: address of endpoints; function to be performed on the endpoint; and data arguments specific to the command to be run. A small part of the action object must contain the return end path for the object. This may identify how to communicate with the action object in case of a breakdown in normal network communications. An action object can contain either a class or object containing program information or data to be delivered eventually to an endpoint or a set of commands to be performed at the appropriate gateway. Action objects IP return back a result for each address endpoint targeted.

Using commands such as "Ping", "Trace Route", "Wake-On LAN", and "Discovery", the AOIP object performs the following services: facilitates the accumulation of metrics for the user connections; assists in the description of the topology of a connection; performs Wake-On LAN tasks using helper functions; and discovers active agents in the network environment.

The NELS service finds a route to communicate between the application and the appropriate endpoint. The NELS service converts input to protocol, network address, and gateway location for use by action objects. The NELS service is a thin service that supplies information discovered by the IPOP service. The primary roles of the NELS service are as follows: support the requests of applications for routes; maintain the gateway and endpoint caches that keep the route information; ensure the security of the requests; and perform the requests as efficiently as possible to enhance performance.

For example, an application requires a target endpoint (target resource) to be located. The target is ultimately known within the DKS space using traditional network values, i.e. a specific network address and a specific protocol identifier. An action object is generated on behalf of an application to resolve the network location of an endpoint. The action object asks the NELS service to resolve the network address and define the route to the endpoint in that network.

One of the following is passed to the action object to specify a destination endpoint: an EndpointAddress object; a fully decoded NetworkAddress object; or a string representing the IP address of the IP endpoint. In combination with the action objects, the NELS service determines which gateway to use to reach a particular resource. The appropriate gateway is determined using the discovery service of the appropriate topology driver and may change due to load balancing or failure of primary gateways. An "EndpointAddress" object must consist of a collection of at least one or more unique managed resource IDs. A managed resource ID decouples the protocol selection process from the application and allows the NELS service to have the flexibility to decide the best protocol to reach an endpoint. On return from the NELS service, an "AddressEndpoint" object is returned, which contains enough information to target the best place to communicate with the selected IP endpoints. It should be noted that the address may include protocol-dependent addresses as well as protocol-independent addresses, such as the virtual private network id and the IPOP Object ID. These additional addresses handle the case where duplicate addresses exist in the managed region.

When an action needs to be taken on a set of endpoints, the NELS service determines which endpoints are managed by which gateways. When the appropriate gateways are identified, a single copy of the action object is distributed to each identified gateway. The results from the endpoints are asynchronously merged back to the caller application through the appropriate gateways. Performing the actions asynchronously allows for tracking all results whether the endpoints are connected or disconnected. If the AOIP fails to execute on its target gateway, NELS is consulted to identify an alternative path for the command. If an alternate path is found, the action object IP is transported to that gateway and executed. It may be assumed that the entire set of commands within one action object IP must fail before this recovery procedure is invoked.

Figure 4:
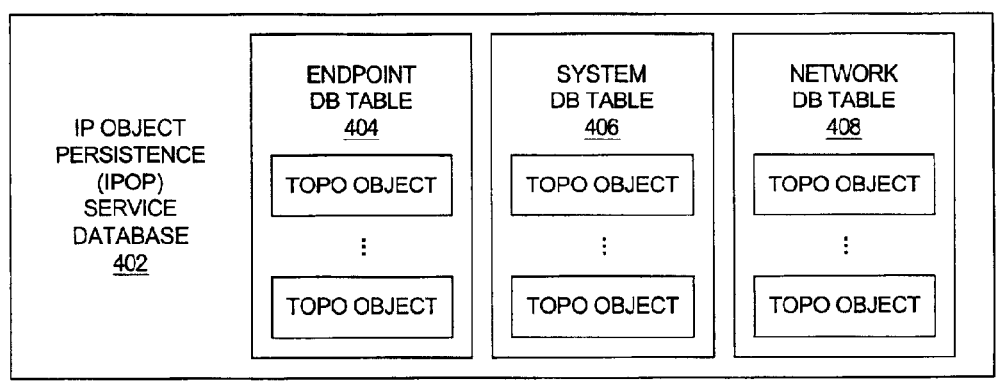
FIG. 4 is a block diagram showing data stored by a the IPOP (IP Object Persistence) service.

With reference now to FIG. 4, a block diagram shows the manner in which data is stored by the IPOP (IP Object Persistence) service. IPOP service database 402 contains endpoint database table 404, system database table 406, and network database table 408. Each table contains a set of topological objects (TopoObjects) for facilitating the leasing of resources at IP endpoints and the execution of action objects. Information within IPOP service database 402 allows applications to generate action objects for resources previously identified as IP objects through a discovery process across the distributed computing environment. FIG. 4 merely shows that the TopoObjects may be separated into a variety of categories that facilitate processing on the various objects. The separation of physical network categories facilitates the efficient querying and storage of these objects while maintaining the physical network relationships in order to produce a graphical user interface of the network topology.

Figure 5A:
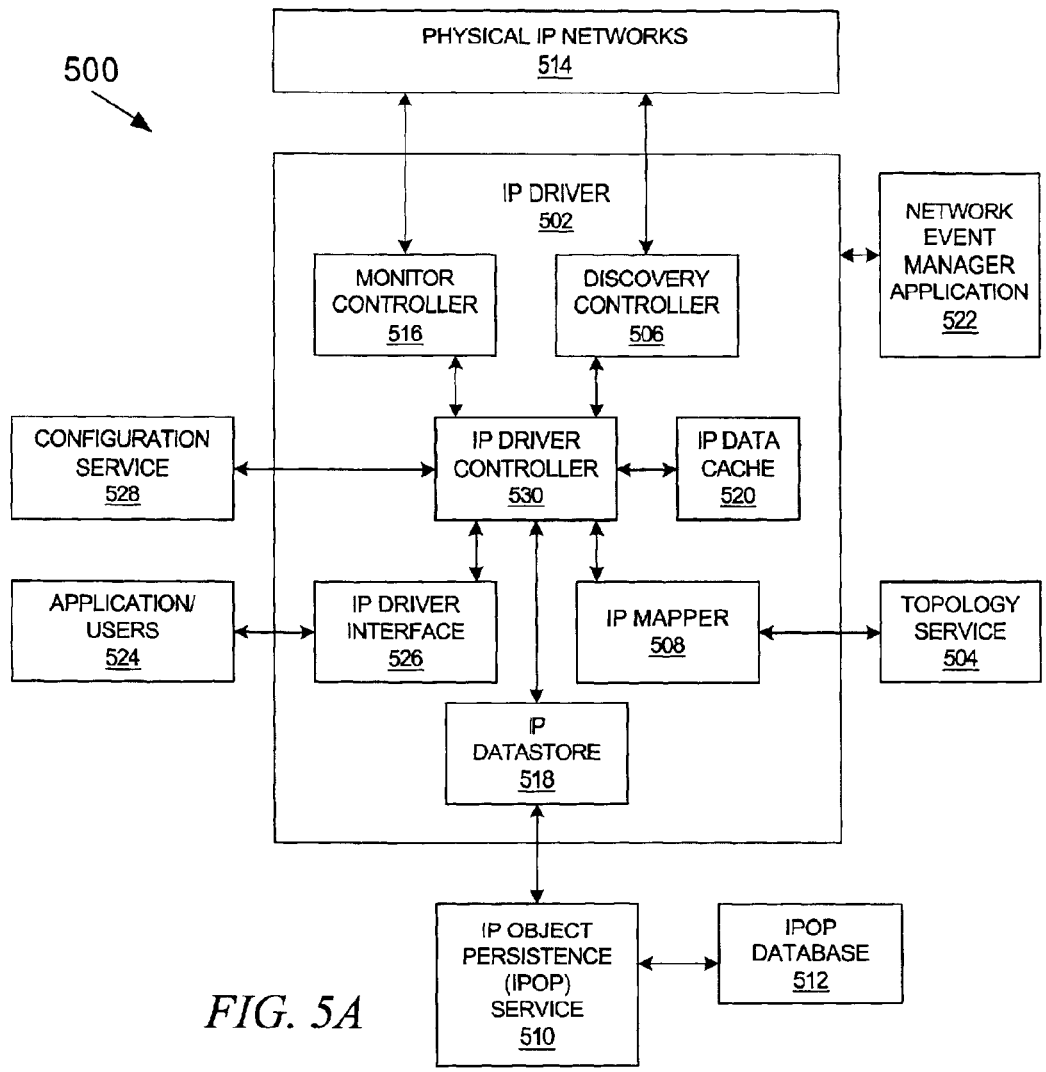
FIG. 5A is a block diagram showing the IPOP service in more detail.

With reference now to FIG. 5A, a block diagram shows the IPOP service in more detail. In the preferred embodiment of the present invention, an IP driver subsystem is implemented as a collection of software components for discovering, i.e. detecting, IP "objects", i.e. IP networks, IP systems, and IP endpoints by using physical network connections. This discovered physical network is used to create topology data that is then provided through other services via topology maps accessible through a graphical user interface (GUI) or for the manipulation of other applications. The IP driver system can also monitor objects for changes in IP topology and update databases with the new topology information. The IPOP service provides services for other applications to access the IP object database.

IP driver subsystem 500 contains a conglomeration of components, including one or more IP drivers 502. Every IP driver manages its own "scope", which is described in more detail further below, and every IP driver is assigned to a topology manager within topology service 504, which can serve more than one IP driver. Topology service 504 stores topology information obtained from discovery controller 506. The information stored within the topology service may include graphs, arcs, and the relationships between nodes determined by IP mapper 508. Users can be provided with a GUI to navigate the topology, which can be stored within a database within the topology service.

IPOP service 510 provides a persistent repository 512 for discovered IP objects; persistent repository 512 contains attributes of IP objects without presentation information. Discovery controller 506 detects IP objects in physical IP networks 514, and monitor controller 516 monitors IP objects. A persistent repository, such as IPOP database 512, is updated to contain information about the discovered and monitored IP objects. IP driver may use temporary IP data store component 518 and IP data cache component 520 as necessary for caching IP objects or storing IP objects in persistent repository 512, respectively. As discovery controller 506 and monitor controller 516 perform detection and monitoring functions, events can be written to network event manager application 522 to alert network administrators of certain occurrences within the network, such as the discovery of duplicate IP addresses or invalid network masks.

External applications/users 524 can be other users, such as network administrators at management consoles, or applications that use IP driver GUI interface 526 to configure IP driver 502, manage/unmanage IP objects, and manipulate objects in persistent repository 512. Configuration service 528 provides configuration information to IP driver 502. IP driver controller 530 serves as central control of all other IP driver components.

Referring back to FIG. 2G, a network discovery engine is a distributed collection of IP drivers that are used to ensure that operations on IP objects by gateways 260, 270, and 280 can scale to a large installation and provide fault-tolerant operation with dynamic start/stop or reconfiguration of each IP driver. The IPOP service stores and retrieves information about discovered IP objects; to do so, the IPOP service uses a distributed database in order to efficiently service query requests by a gateway to determine routing, identity, or a variety of details about an endpoint. The IPOP service also services queries by the topology service in order to display a physical network or map them to a logical network, which is a subset of a physical network that is defined programmatically or by an administrator. IPOP fault tolerance is also achieved by distribution of IPOP data and the IPOP service among many endpoint ORBs.

One or more IP drivers can be deployed to provide distribution of IP discovery and promote scalability of IP driver subsystem services in large networks where a single IP driver is not sufficient to discover and monitor all IP objects. Each IP driver performs discovery and monitoring on a collection of IP resources within the driver's "scope". A driver's scope, which is explained in more detail below, is simply the set of IP subnets for which the driver is responsible for discovering and monitoring. Network administrators generally partition their networks into as many scopes as needed to provide distributed discovery and satisfactory performance.

A potential risk exists if the scope of one driver overlaps the scope of another, i.e. if two drivers attempt to discover/monitor the same device. Accurately defining unique and independent scopes may require the development of a scope configuration tool to verify the uniqueness of scope definitions. Routers also pose a potential problem in that while the networks serviced by the routers will be in different scopes, a convention needs to be established to specify to which network the router "belongs", thereby limiting the router itself to the scope of a single driver.

Some ISPs may have to manage private networks whose addresses may not be unique across the installation, like 10.0.0.0 network. In order to manage private networks properly, first, the IP driver has to be installed inside the internal networks in order to be able to discover and manage the networks. Second, since the discovered IP addresses may not be unique across an entire installation that consists of multiple regions, multiple customers, etc., a private network ID has to be assigned to the private network addresses. In the preferred embodiment, the unique name of a subnet becomes "privateNetworkId\subnetAddress". Those customers that do not have duplicate networks address can just ignore the private network ID; the default private network ID is 0.

If Network Address Translator (NAT) is installed to translate the internal IP addresses to Internet IP addresses, users can install the IP drivers outside of NAT and manage the IP addresses inside the NAT. In this case, an IP driver will see only the translated IP addresses and discover only the IP addresses translated. If not all IP addresses inside the NAT are translated, an IP driver will not able to discover all of them. However, if IP drivers are installed this way, users do not have to configure the private network within the IP driver's scope.

Scope configuration is important to the proper operation of the IP drivers because IP drivers assume that there are no overlaps in the drivers' scopes. Since there should be no overlaps, every IP driver has complete control over the objects within its scope. A particular IP driver does not need to know anything about the other IP drivers because there is no synchronization of information between IP drivers. The configuration service provides the means to allow the DKS components to store and retrieve configuration information for a variety of other services from anywhere in the networks. In particular, the scope configuration will be stored in the configuration service so that IP drivers and other applications can access the information.

The ranges of addresses that a driver will discover and monitor are determined by associating a subnet address with a subnet mask and associating the resulting range of addresses with a subnet priority. An IP driver is a collection of such ranges of addresses, and the subnet priority is used to help decide the system address. A system can belong to two or more subnets, such as is commonly seen with a gateway. The system address is the address of one of the NICs that is used to make SNMP queries. A user interface can be provided, such as an administrator console, to write scope information into the configuration service. System administrators do not need to provide this information at all, however, as the IP drivers can use default values.

An IP driver gets its scope configuration information from the configuration service, which may be stored using the following format:
scopeID=driverID,anchorname,subnetAddress:subnetMask [:privateNetworkId:privateNetworkName:subnetPriority] [, subnetAddress:subnetMask:privateNetworkId:privateNetworkName :subnetPriority]]

Typically, one IP driver manages only one scope. Hence, the "scopeID" and "driverID" would be the same. However, the configuration can provide for more than one scope managed by the same driver. "Anchorname" is the name in the name space in which the topology service will put the IP driver's network objects.

A scope does not have to include an actual subnet configured in the network. Instead, users/administrators can group subnets into a single, logical scope by applying a bigger subnet mask to the network address. For example, if a system has subnet "147.0.0.0" with mask of "255.255.0.0" and subnet "147.1.0.0" with a subnet mask of "255.255.0.0", the subnets can be grouped into a single scope by applying a mask of "255.254.0.0". Assume that the following table is the scope of IP Driver 2. The scope configuration for IP Driver 2 from the configuration service would be: 2=2, ip, 147.0.0.0:255.254.0.0,146.100.0.0:255.255.0.0, 69.0.0.0:255.0.0.0.

| Subnet address | Subnet mask |
|---|---|
| 147.0.0.0 | 255.255.0.0 |
| 147.1.0.0 | 255.255.0.0 |
| 146.100.0.0 | 255.255.0.0 |
| 69.0.0.0 | 255.0.0.0 |

In general, an IP system is associated with a single IP address, and the "scoping" process is a straightforward association of a driver's ID with the system's IP address.

Routers and multi-homed systems, however, complicate the discovery and monitoring process because these devices may contain interfaces that are associated with different subnets. If all subnets of routers and multi-homed systems are in the scope of the same driver, the IP driver will manage the whole system. However, if the subnets of routers and multi-homed systems are across the scopes of different drivers, a convention is needed to determine a dominant interface: the IP driver that manages the dominant interface will manage the router object so that the router is not being detected and monitored by multiple drivers; each interface is still managed by the IP driver determined by its scope; the IP address of the dominant interface will be assigned as the system address of the router or multi-homed system; and the smallest (lowest) IP address of any interface on the router will determine which driver includes the router object within its scope.

Users can customize the configuration by using the subnet priority in the scope configuration. The subnet priority will be used to determinate the dominant interface before using the lowest IP address. If the subnet priorities are the same, the lowest IP address is then used. Since the default subnet priority would be "0", then the lowest IP address would be used by default.

Figure 5B:
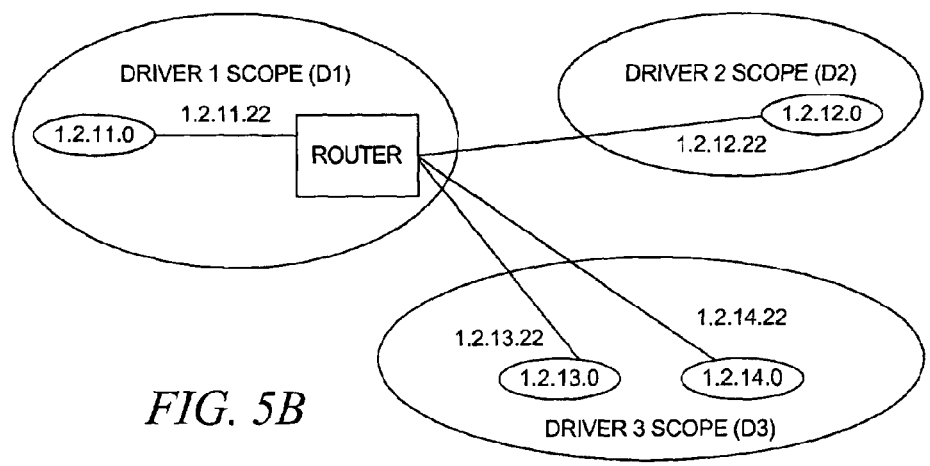
FIG. 5B is a network diagram depicting a set of routers that undergo a scoping process.

With reference now to FIG. 5B, a network diagram depicts a network with a router that undergoes a scoping process. IP driver D1 will include the router in its scope because the subnet associated with that router interface is lower than the other three subnet addresses. However, each driver will still manage those interfaces inside the router in its scope. Drivers D2 and D3 will monitor the devices within their respective subnets, but only driver D1 will store information about the router itself in the IPOP database and the topology service database.

If driver D1's entire subnet is removed from the router, driver D2 will become the new "owner" of the router object because the subnet address associated with driver D2 is now the lowest address on the router. Because there is no synchronization of information between the drivers, the drivers will self-correct over time as they periodically rediscover their resources. When the old driver discovers that it no longer owns the router, it deletes the router's information from the databases. When the new driver discovers the router's lowest subnet address is now within its scope, the new driver takes ownership of the router and updates the various databases with the router's information. If the new driver discovers the change before the old driver has deleted the object, then the router object may be briefly represented twice until the old owner deletes the original representation.

There are two kinds of associations between IP objects. One is "IP endpoint in IP system" and the other is "IP endpoint in IP network". The implementation of associations relies on the fact that an IP endpoint has the object IDs (OIDs) of the IP system and the IP network in which it is located. An IP driver can partition all IP networks, IP Systems, and IP endpoints into different scopes. A network and all its IP endpoints will always be assigned in the same scope. However, a router may be assigned to an IP driver, but some of its interfaces are assigned to different IP drivers. The IP drivers that do not manage the router but manage some of its interfaces will have to create interfaces but not the router object. Since those IP drivers do not have a router object ID to assign to its managed interfaces, they will assign a unique system name instead of object ID in the IP endpoint object to provide a link to the system object in a different driver.

Because of the inter-scope association, when the IP Object Persistence service (IPOP) is queried to find all the IP endpoints in system, it will have to search not only IP endpoints with the proper system ID but also IP endpoints with its system name. If a distributed IP Object Persistence service is implemented, the service has to provide extra information for searching among its distributed instances.

As described above, an IP driver subsystem is implemented as a collection of software components for discovering, i.e. detecting, network "objects", such as IP networks, IP systems, and IP endpoints by using physical network connections. The collected data is then provided through other services via topology maps accessible through a GUI or for the manipulation of other applications. The IP driver system can also monitor objects for changes in IP topology and update databases with the new topology information. The IPOP service provides services for other applications to access the IP object database.

Referring again to FIG. 5A, IP driver subsystem 500 contains a conglomeration of components, including one or more IP drivers 502. Every IP driver manages its own "scope", and every IP driver is assigned to a topology manager within topology service 504, which stores topology information obtained from discovery controller 506. The information stored within the topology service may include graphs, arcs, and the relationships between nodes determined by IP mapper 508. Users can be provided with a GUI to navigate the topology, which can be stored within a database within the topology service.

As noted previously, a service provider may use a network management framework, such as that described above, to perform device monitoring and discovery for the networks of multiple customers. The service provider may guarantee various levels of service to different customers. In most aspects of the operation of the network management framework, though, it is likely that the service provider requires the fastest possible response times regardless of whether a portion of the network management framework is operating on behalf of one customer versus another customer. For example, the service provider may guarantee that a large distributed data processing system can be initialized within a period of two minutes without regard to customers.

Meeting quality-of-service objectives in a highly distributed system can be quite difficult, and significant effort should be made to ensure that the activities of the network management framework do not degrade the performance of the system as seen by the customers of the service provider. To this end, the management system should be able to adjust its bandwidth and memory requirements. However, within a system that performs network management tasks for a million devices or more, a tremendous amount of computational resources throughout the system could be consumed for database access while fulfilling administrative duties. Using the same example mentioned above, initializing a system with more than a million devices within a two minute period requires a tremendous amount of communication bandwidth and memory consumption while accessing distributed databases. In particular, representing each endpoint within the distributed data processing system may require a number of objects; hence, a system with more than a million devices may require several million objects. In a distributed network management framework in which many servers or components require access to the objects, each object may need to be copied to multiple locations. In this type of environment, one can easily understand that database operations should be optimized in order to minimize memory and bandwidth consumption.

In order to solve this and other problems, the present invention provides a method and system that adapts the administrative database operations so as to minimize the impact on system performance that is caused by the system management operations. In particular, performance adjustments occurred dynamically in accordance with the current needs of the system management infrastructure.

In a nutshell, the present invention emulates the database in memory and presents an interface to an application such that the application would determine that there is little overhead for accessing the database. In order to expedite a database access, some objects are pre-fetched into a cache.

More importantly, though, the present invention implements a mechanism in which some objects are merely represented in the cache as a "skeleton object". A skeleton object holds only a fraction of an object's full complement of data; the skeleton object remains associated with its complete object, also termed its corresponding "full object" or "non-skeleton object", which remains stored within the data processing system, preferably in its original location within a database from which the skeleton object was generated.

When it is determined that a network management framework component may need access to objects within a database, some full objects may be pre-fetched into a cache while other full objects may be merely represented within the cache by their corresponding skeleton objects. Hence, some of the full objects that could have been pre-fetched into the cache are represented within the cache only by their corresponding skeleton objects. A cache comprising at least one skeleton object may be termed a "skeleton cache" or a "skeletonized cache"; a skeleton cache may store only skeleton objects, but in the preferred embodiment, the skeleton cache stores both skeleton objects and full objects.

Whereas typical caching operations require the initiation of a data request in order to identify a needed data item, the pre-loading of the cache in the present invention may be performed before the network management framework component initiates its first request for an object; the pre-loading operation may be based on a state of the network management framework component, e.g., a network management framework component that is being initialized can be recognized by a startup service as probably requiring a significant number of database accesses.

When a request is eventually made by the network management framework component to retrieve an object that has been pre-loaded into the cache, it is determined whether the cached object satisfies the request. In some cases, only the skeleton object will have been pre-loaded, but because the network management framework component requires only the portion of the object data that is represented within the skeleton object, the data request can be quickly satisfied. In other cases, only the skeleton object will have been pre-loaded, and the network management framework component requires a portion of the object data that is not stored within the skeleton object, thereby requiring a complete fetch of the object in response to the data request, in addition to a probable update of the cache with the full object.

In a given implementation of a network management framework, the types of objects that are used by the network management framework components will dictate the types of corresponding skeleton objects. In order for the network management framework to be as flexible as possible, each type of skeleton object is structured in accordance with a skeleton definition associated with the skeleton object; the skeleton definition allows a skeleton handler, i.e. a manager component for the operations on skeleton objects, to determine which attributes within an object should be represented within its corresponding skeleton object. The attributes of an object that are not fully valued within the skeleton object are termed "skeleton attributes".

In addition, again so that the network management framework can be as flexible as possible, the present invention employs skeleton policies. A skeleton policy defines when a full object should be "skeletonized", i.e. when an object should be retrieved from persistent storage into memory, e.g., a cache, as a skeleton object rather than as a copy of the full object. Various network management framework components refer to the skeleton policy such that the skeleton policy directs the operation of the network management framework components with respect to a particular object, i.e. the network management framework components determine when to skeletonize an object based on information within the skeleton policy.

Database accessors are discussed in more detail below with respect to FIG. 6 and FIG. 7. In summary, a database accessor component provides database access functionality to a data consumer, i.e. data requester. Each network management framework component that is consuming data from a distributed database may access the distributed database through a database accessor, which presents an interface to the database so that the consumers of data from the database can operate independent of communication modes, protocols, types of databases, etc. The requester uses the database accessor APIs for any needed database services; in essence, a database accessor hides details about database connection management, database security, data transport, remote method invocations, and other types of details. As part of its duties, a database accessor can skeletonize data via a skeleton handler with reference to a skeleton policy.

The present invention allows for a prediction of when a network management framework component containing a database accessor will use an assessor method to get data from the database. Using database accessors with embedded skeleton handlers, a delayed load can be performed for all objects within a database. As a brief example, priority for retrieving full objects may be made based on those objects which are being viewed, i.e. immediately used, within a topology GUI application, whereas all other object would be skeletonized. If only network "A" is being viewed, then only those objects within network "A" should be fully loaded; other objects can be skeletonized. If an administrative user that is logged into a network management application, such as a topology GUI application, only has security access to network "B", then only those objects within network "B" should be fully loaded; other objects can be skeletonized. Skeletonized data can be updated on an as-needed or on-demand basis or when otherwise convenient; at that time, a skeleton handler can detect when a request is made for the object, i.e. when the skeleton object is being used, get the remaining data from persistent storage, and then mark the cached object as being a full object or non-skeleton object.

More specifically with respect to the DKS network management framework components that were discussed in detail above, the present invention allows an IPOP server to pre-cache data by querying IPOP database before receiving a request from an IP driver. By pre-fetching data, the IPOP server can immediately send requested data from its memory rather than querying the database when an IP driver asks for the data. It should be noted that various components within an IP driver, such as the IP mapper, the discovery controller, or the monitor controller, can request data from the IPOP service. A skeleton policy can be defined with respect to each consumer of IPOP data; hence, a skeleton policy can be defined with respect to an IP mapper or an IP driver discovery controller or any other component using an IPOP accessor.

Using a specific example, a selective load operation can be performed from the IPOP database into the IPOP service's cache memory as an IP driver discovery controller or monitor controller is initializing. Based on the specific IP driver that is starting, the system can predict the data that will be needed by the IP driver, in accordance with its assigned scope or other configuration parameters. The system can then preload the predicted data while selectively skeletonizing or fully loading the data from persistent storage in cache memory. Data is then transferred from IPOP memory to the discovery controller when requested to do so.

Figure 6:
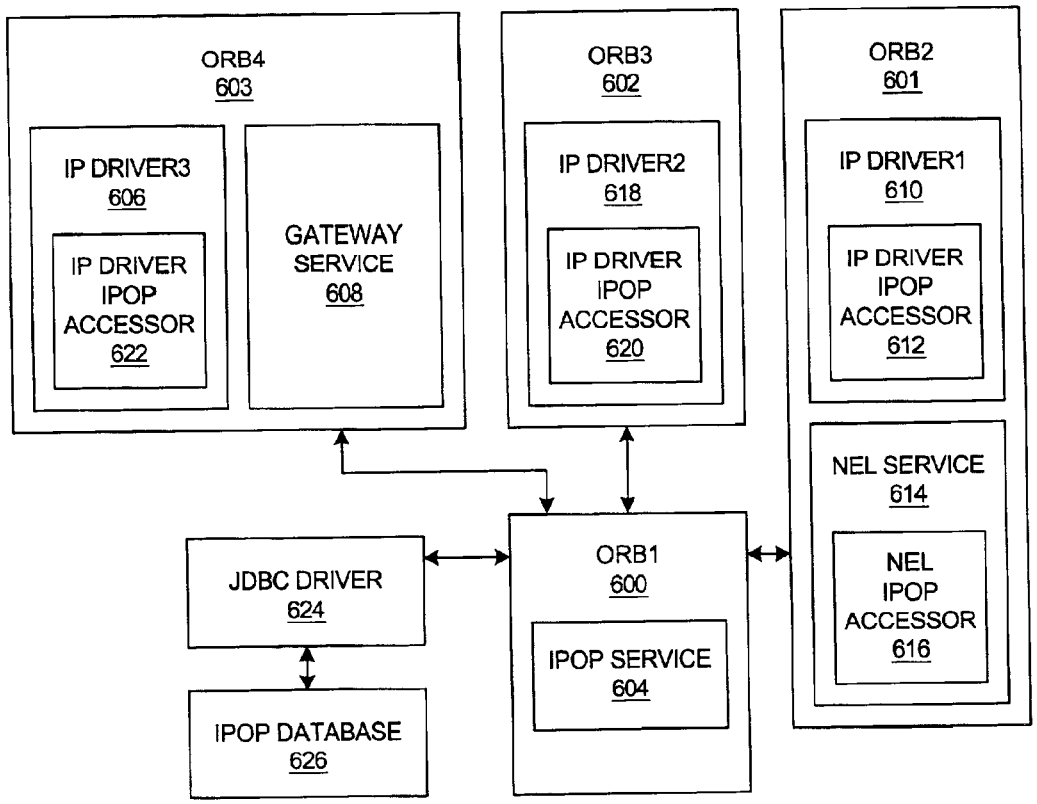
FIG. 6 is a block diagram depicting components within the network management framework that provide resource/database access functionality.

With reference now to FIG. 6, a block diagram depicts components within the network management framework that provide resource/database access functionality. A network contains four ORBs 600–603. IPOP service 604 runs on ORB1 600; in general, an ORB can support different services that are configured to run in conjunction with an ORB. For example, ORB4 603 includes an instance of an IP driver, i.e. IP driver3 606, and gateway service 608.

IP driver1 610 on ORB2 601 comprises distributed IP driver IPOP accessor 612 that facilitates access to the IPOP database on behalf of IP driver1 service 610; in addition, ORB2 601 supports NEL service 614, which uses NEL IPOP accessor 616 to facilitate access to the IPOP database. ORB3 602 contains IP driver2 618 with embedded IP driver IPOP accessor 620 that also facilitates access to the IPOP database on behalf of IP driver2 service 618. ORB4 603 contains IP driver3 606 with embedded IP driver IPOP accessor 622 that also facilitates access to the IPOP database on behalf of IP driver3 service 606.

Java™ database connectivity (JDBC) driver 624 (or other data access server service as appropriate) connects IPOP service 604 to native IPOP database 626. JDBC provides a database-neutral access mechanism for the components and applications in the DKS framework. IPOP database 626 provides storage for the IPOP data; other databases, such as a topology database, are not shown.

Figure 7:
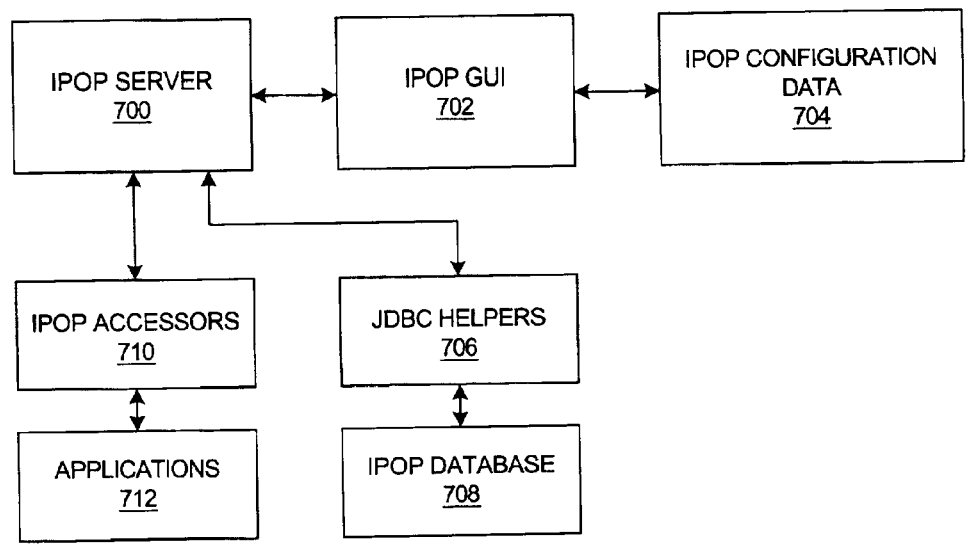
FIG. 7 is a block diagram depicting a logical organization of the IPOP service.

With reference now to FIG. 7, a block diagram depicts a logical organization of the IPOP service. The IPOP architecture includes IPOP server 700 for providing the IPOP services. IPOP GUI application 702 allows an administrative user to interact with the IPOP service, including allowing the administrator to input to IPOP configuration data 704. The IPOP service utilizes database helpers representatively illustrated as JDBC database helpers 706 for accessing IPOP database 708, which provides persistent storage of IP objects and other types of network-related data.

IPOP accessors 710 provide a plurality of IPOP database access mechanisms for DKS applications 712 or components to access services, perform actions, and to read and write data to the IPOP database. Each of the access mechanisms, i.e. accessors, is available on a distributed basis as part of the IPOP Service. A set of different accessors may be available, each of which is tailored to the needs of a particular data consumer; using object-oriented methodology, a base Accessor class may be extended as needed to include different functionality.

Figure 8:
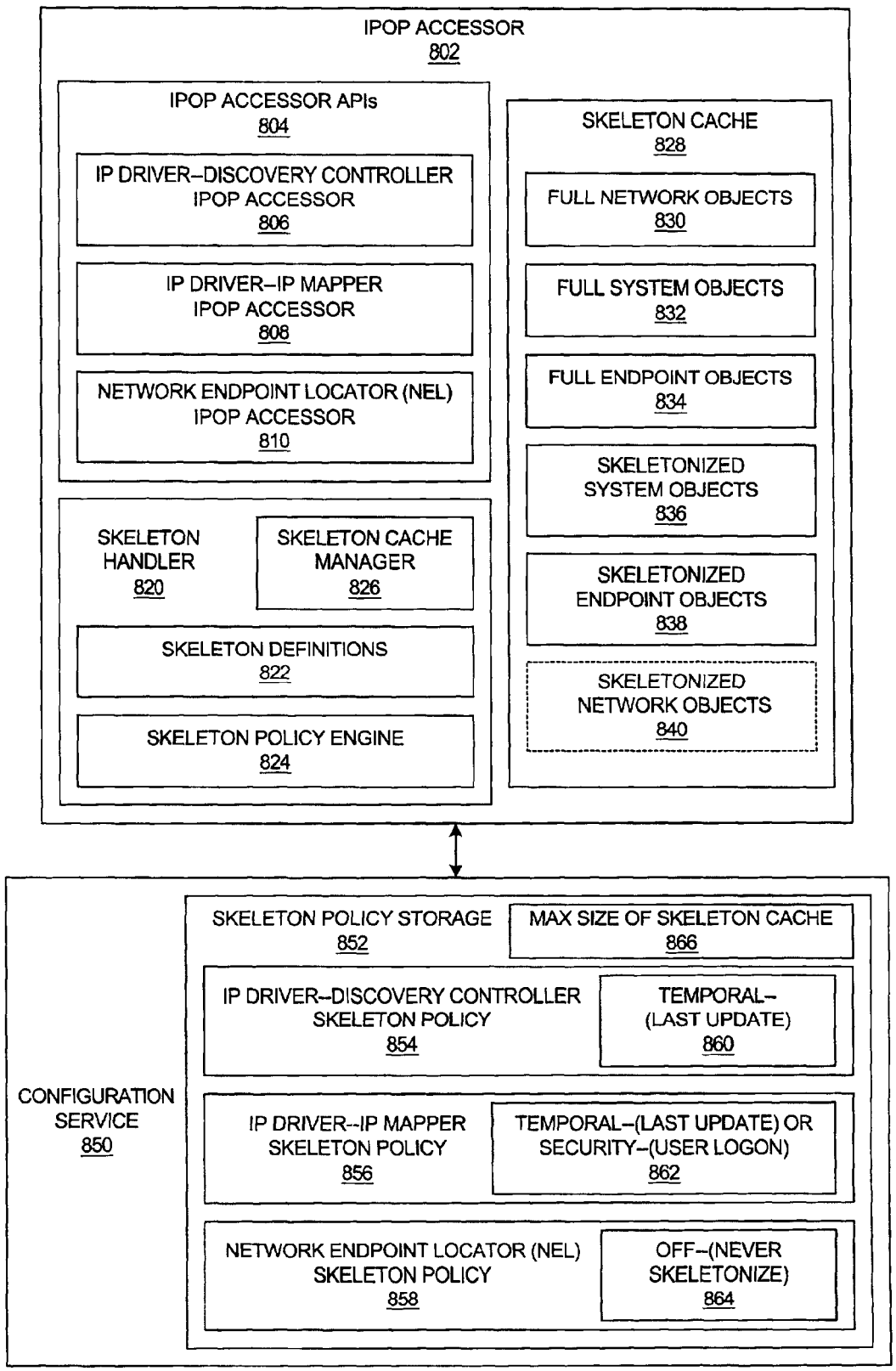
FIG. 8 is a block diagram depicting a more detailed view of the IPOP accessors that are shown in FIG. 7.

With reference now to FIG. 8, a block diagram depicts a more detailed view of the IPOP accessors that are shown in FIG. 7. IPOP accessor 802 comprises a set of IPOP accessor APIs 804, i.e. database accessor APIs that are specifically configured for accessing the IPOP database. In this example, IPOP accessor 802 contains functionality for acting as an IPOP accessor on behalf of any network management framework component that may require such functionality, e.g., IP driver discovery controller IPOP accessor 806, IP driver IP mapper IPOP accessor 808, or NEL IPOP accessor 810; alternatively, IPOP accessor 802 may be specifically configured for only one type of network management framework component.

As explained above, the present invention provides a skeletonizing mechanism that may be implemented throughout a distributed data processing system; in a preferred embodiment, the skeletonizing mechanism is embedded within the database accessors that are used within the network management framework components. Hence, IPOP accessor 802 comprises skeleton handler 820. Skeleton handler 820 is a manager component for the handling the skeletonizing mechanism of the present invention, i.e. for performing operations on skeleton objects; skeleton handler 820 comprises various APIs or other forms of functionality for performing these operations.

For example, a simple "isSkeletonAttribute" method provided by skeleton handler 820 may provide a boolean determination of whether or not a specific attribute in an object, as identified by its unique object ID (OID), is a skeleton attribute.

As mentioned previously, the attributes of an object that are not fully valued within the skeleton object are termed "skeleton attributes", i.e. a skeleton attribute is dataless, i.e. does not contain or has not been given or assigned a data value, whereas "non-skeleton attributes" or "full attributes" would contain a data value and are considered "fully valued". In a manner similar to a cache being characterized as a "skeleton cache" or a "skeletonized cached" when it comprises both full objects and skeleton objects, a "skeletonized object" comprises both fully valued attributes and skeleton attributes. If an object in a skeleton cache comprises only fully valued attributes, it is then considered a "full object".

Skeleton handler 820 checks with an appropriate skeleton definition within skeleton definitions 822 for the object in order to identify skeleton attributes versus non-skeleton attributes. Other methods may provide the following functionality: retrieving the skeleton definition for an object; determining whether an object has a skeleton definition, i.e. whether the object is skeletonizable; determining whether a particular object is a specific type of skeleton object or determining what type of skeleton object within a set of skeleton objects corresponds to a specific object; initializing a skeleton object within a skeleton cache; "morphing" a skeleton object into a full object, i.e. reading the full object from persistent storage (or otherwise obtaining values for skeleton attributes) into the skeleton cache and marking an object as "not-skeleton" or "fully valued"; obtaining a skeleton policy for skeleton policy engine 824; or any other necessary functionality.

Skeleton cache manager 826 within skeleton handler 820 performs specific actions with respect to the skeleton cache, such as the following operations: determining whether a skeleton cache should be used within a given implementation or system state; determining the size of skeleton cache 828 prior to creating skeleton cache 828 if a skeleton cache is to be used within a given implementation or system state; storing and retrieving full objects, skeleton objects, full attributes, and skeleton attributes to and from skeleton cache 828; or any other necessary functionality.

Skeleton cache 828 comprises cache memory storage for full objects, such as full network objects 830, full system objects 832, and full endpoint objects 834. Skeleton cache 828 also comprises cache memory storage for skeleton objects, such as skeletonized system objects 836 and skeletonized endpoint objects 838. In this example, skeleton cache 828 does not store skeletonized network objects 840 because it is assumed that the number of network objects is much lower than the number of system objects and endpoint objects. For example, a network might be able to hold 255 endpoints; hence, the ratio of network objects to endpoint objects is so low that a given implementation of the skeleton mechanism always processes network objects as full objects. Moreover, it is more likely that a particular network object will be accessed more often than a particular system object or endpoint object because the network object sometimes represents all systems and endpoints within the network. Therefore, network objects are never skeletonized into skeletonized network objects; in an alternative embodiment, network objects could be skeletonized into skeletonized network objects.

It should be noted that the example in FIG. 8 depicts full objects stored separately from their corresponding skeleton objects; in an alternate embodiment, a full object of one class of object could be stored and managed together with the corresponding skeleton object of that class of object.

Skeleton definitions describe whether an object should be skeletonized, and if so, the object attributes that should be regarded as skeleton attributes versus the object attributes that should be regarded a fully valued attributes, whereas skeleton policies describe when the network management framework should or should not be attempting to skeletonize objects. A skeleton definition is a low-level control within the skeletonizing mechanism of the present invention that determines whether or not a given object should be skeletonized and, if so, in what manner. A skeleton policy is a high-level control within the skeletonizing mechanism of the present invention that determines whether or not the skeletonizing mechanism should be operational at any given time and, if so, what factors are to be considered in the determination of whether or not to allow skeletonization.

In other words, skeleton policies determine when objects should be skeletonized based on various factors within the network management framework. Via configuration service 850, skeleton policy engine 824 refers to skeleton policies within skeleton policy storage 852 to obtain guidance or direction with respect to controlling skeletonization; in a preferred embodiment, skeleton policy engine 824 strictly adheres to the stored skeleton policies, but in an alternate embodiment, the stored skeleton policies may merely provide guidance in the form of conditions to be loosely considered but that may be otherwise overridden depending upon other factors within the network management framework.

As noted previously, skeleton handlers may be embedded within database accessors. In the preferred embodiment, a separate skeleton policy is available for each of the multiple types of database accessors that are employed within the network management framework. In this example, skeleton policy storage comprises: skeleton policy 854 for the IP driver discovery controller's IPOP accessor; skeleton policy 856 for the IP driver IP mapper's IPOP accessor; and skeleton policy 858 for the NEL service's IPOP accessor. Each skeleton policy comprises configuration parameters that supply values for the possible factors or conditions that are to be considered when determining whether skeletonization is to be performed for a given database accessor.

Skeleton policy 854 for the IP driver discovery controller's IPOP accessor is configured to perform skeletonization of objects on a temporal basis as indicated by parameter 860; depending upon when the most recent update or "last update" was made to an object or a set of objects, the skeleton policy engine or the skeleton handler will decide whether or not to skeletonize objects in the skeleton cache. For example, if an object or a set of objects were recently updated within a database with new data, then the skeletonization of these objects should be not be encouraged because there is a higher likelihood that the objects will change again in the relatively near future.

Skeleton policy 856 for the IP driver IP mapper's IPOP accessor is configured to perform skeletonization on either a temporal basis or based on the identity of the administrative user who is logged on to a network management application that is using the IP driver associated with a particular IP mapper, as indicated by parameter 862. In other words, for a particular administrator, skeletonization may be automatically performed in anticipation of the administrator's actions, whereas skeletonization may never be used for another administrator. These types of distinctions are useful because certain administrative users may be responsible or specialized for performing certain management tasks, and skeletonization may always be helpful or necessary for certain administrators.

In this manner, skeletonization may be based on a wide variety of factors or conditions within the network management framework. For example, rather than limiting skeletonization to a particular administrative user, skeletonization may be based on a class of user; skeletonization might be used for any operations initiated by any user without a particular security restriction, whereas skeletonization might never be used for any operations initiated by any user with a particular security restriction. Likewise, skeletonization could be tailored to classes of devices, classes of communication links, other physical parameters, or combinations of all of the above, on which the network management framework is implemented.

Skeleton policy 858 for the NEL service's IPOP accessor is configured such that skeletonization is never implemented for this particular database accessor as indicated by parameter 864. In this manner, skeletonization can easily be switched off or on. Skeleton policy storage 852 may comprise other parameters associated with managing skeleton policies or skeleton caches, e.g., parameters 866 that indicates the maximum size of the cache within memory as an appropriate value, such as number of megabytes.

The skeletonization mechanism of the present invention may be used in a variety of applications in which intelligent, high-performance, lightweight caching needs to be performed. As mentioned previously, the DKS network management framework described above employs the skeletonization mechanism by embedding a skeleton cache and a skeleton handler within the database accessors. The remaining figures describe various processes that may be used within the skeletonization mechanism of the present invention as employed with respect to the DKS network management framework.

Figure 9:
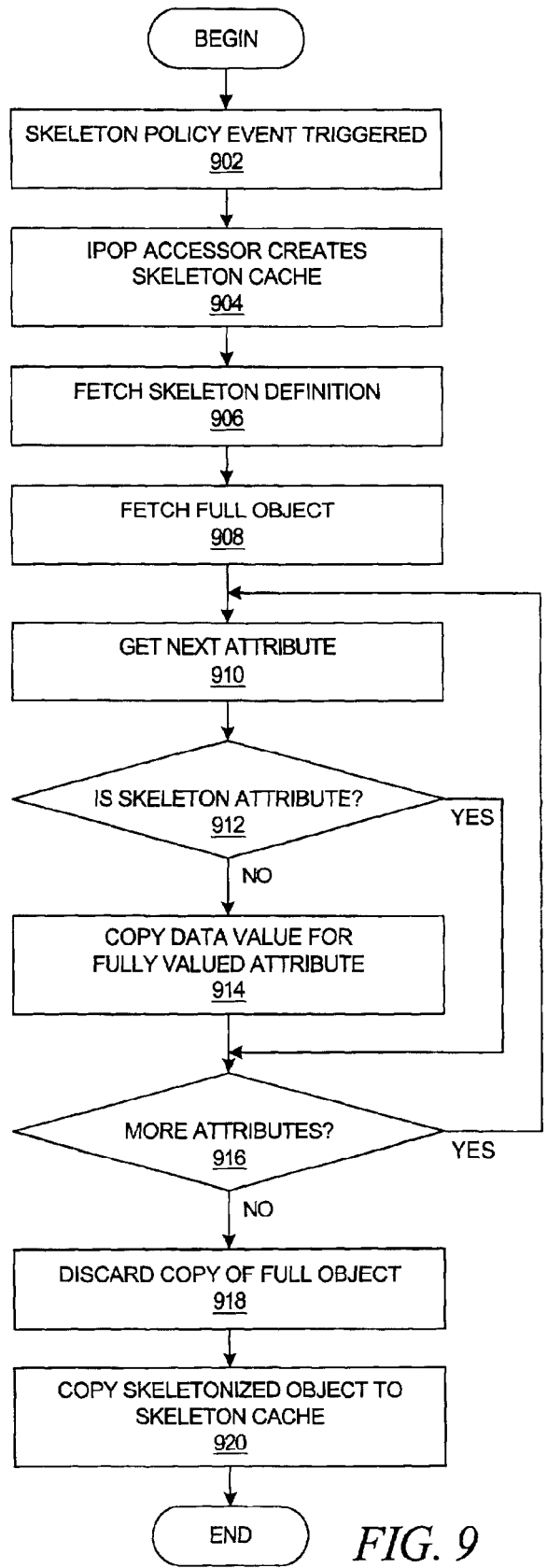
FIG. 9 is a flowchart depicting a process through which a skeletonized endpoint object is created.

With reference now to FIG. 9, a flowchart depicts a process through which a skeletonized endpoint object is created. The process begins with a skeleton policy event triggering the need to create skeleton data for an endpoint (step 902). As mentioned above, a wide variety of policy conditions may be triggered by various actions within the network management framework. For example, if a skeleton policy is configured to operated with respect to user security, then logon events are evaluated with respect to the previously configured skeleton policy and the security authorization parameters associated with a particular administrative user who is logging onto the system.

At some point, the IPOP accessor will operate to retrieve data on behalf of an IPOP data requester, and the skeleton handler in the IPOP accessor creates a skeleton cache in accordance with pre-configured skeleton definitions and skeleton policies (step 904). In this example, the data retrieval operation is with respect to a particular endpoint object; hence, the skeleton cache manager retrieves the skeleton definition for an endpoint object (step 906) and then fetches the full endpoint object for the requested endpoint (step 908).

The skeleton cache manager then loops through the data items, i.e. attributes, within the object and compares the attributes with the skeleton definition. A next attribute is examined for the full endpoint object (step 910), and a determination is made as to whether the value for the attribute from the full endpoint object should be stored within the skeleton cache as a fully valued attribute or whether the attribute is a skeleton attribute (step 912). If the attribute that is being examined is not a skeleton attribute, then the data value for this particular attribute that was retrieved with the full endpoint object from the database is stored within the skeletonized endpoint object (step 914). If the attribute is a skeleton attribute, then no action is taken with respect to the attribute, i.e. the data value for the attribute is not stored within the skeletonized endpoint object. In this manner, significant amounts of memory storage can be saved by not storing all of the data for the attributes within the physical memory that is holding the skeleton cache.

A determination is made as to whether there are other attributes to be examined (step 916), and if so, the process branches back to step 910 to examine another attribute. If not, then the copy of the full endpoint object is discarded from memory (step 918). The newly generated skeletonized endpoint object is stored in the skeleton cache (step 920), and the process is complete.

Figure 10:
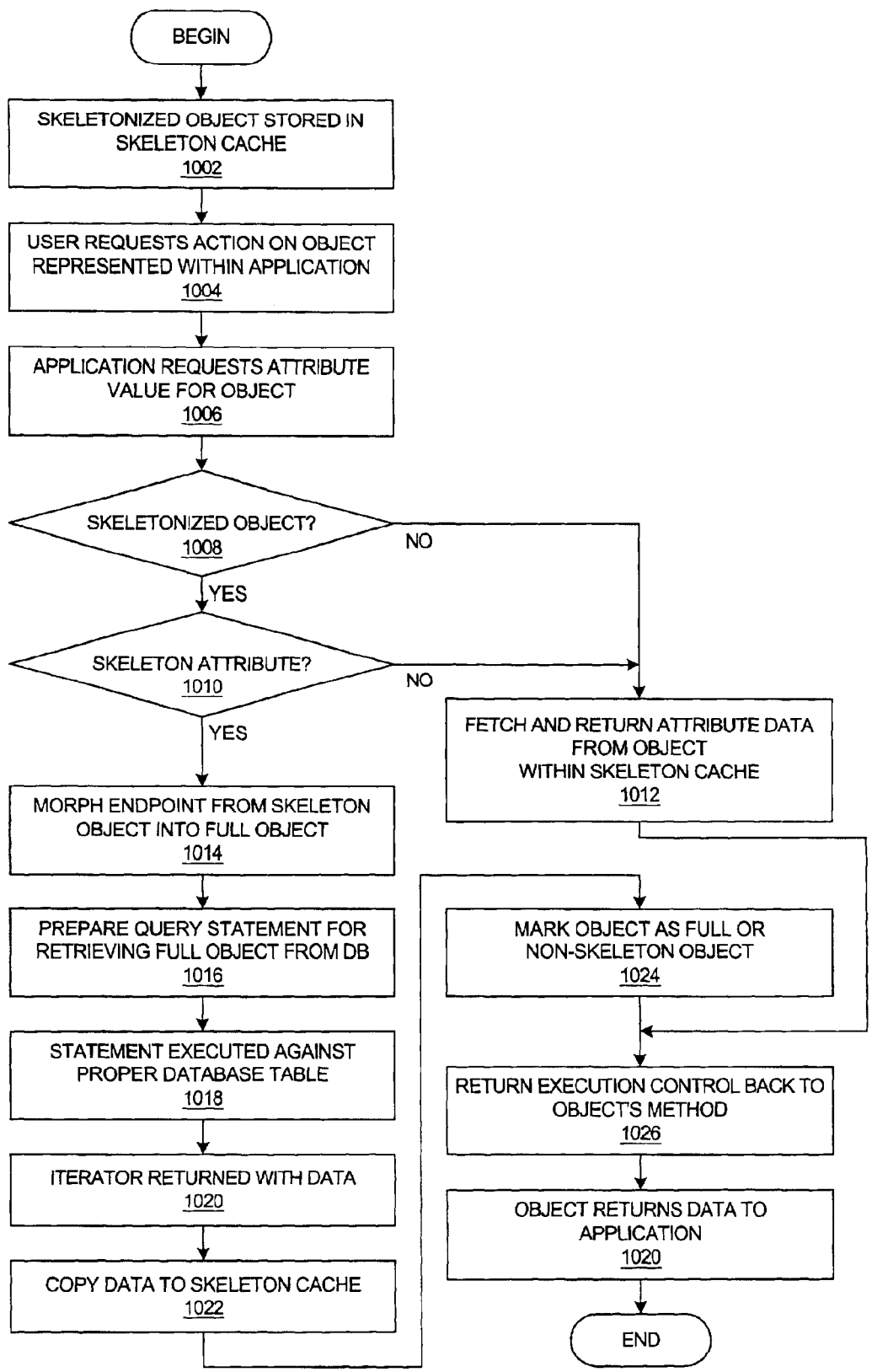
FIG. 10 is a flowchart depicting a process by which the value of an attribute is retrieved in accordance with the skeletonization mechanism of the present invention.

With reference now to FIG. 10, a flowchart depicts a process by which the value of an attribute is retrieved in accordance with the skeletonization mechanism of the present invention. The process begins with an IPOP accessor already using a skeletonized endpoint object (step 1002), i.e. the skeletonized endpoint object may have some attributes which are fully valued and other attributes which are dataless; more importantly, the endpoint object has already been fetched from the IPOP database into a skeleton cache. An administrative user then requests to perform an action on a representation of the endpoint object within a network management application (step 1004). For example, the endpoint may be displayed within a topology map in a topology GUI application, and the user may select the endpoint as the target of some type of network-related action. The network management application then requests a particular attribute from the endpoint object (step 1006), e.g., by calling the appropriate method on the endpoint object to retrieve the value of the attribute.

At this point, the endpoint object is configured to be a type of object that can be skeletonized. Hence, the endpoint object must determine whether or not it is actually has the value of the attribute. A determination is made as to whether the endpoint object is a skeletonized endpoint object or a full endpoint object (step 1008). Preferably, the skeleton handler, via the skeleton cache manager, can check the appropriate flag in the skeleton cache that indicates whether or not the endpoint object is a full object. If the endpoint object is a skeletonized endpoint object, then the endpoint object makes a determination as to whether or not the requested attribute is a skeleton attribute (step 1010). Preferably, the skeleton handler refers to the skeleton definition for endpoint objects to make this determination. If either determination at step 1008 or step 1010 is negative, then the requested attribute is fully valued, i.e. the endpoint object contains the value of the requested attribute, and the endpoint object fetches the value of the requested attribute and returns the fetched value to the requester (step 1012).

If the endpoint object is a skeletonized object and the requested attribute is a skeleton attribute, then the endpoint object does not have the value of the requested attribute, and the value of the attribute must be retrieved from the IPOP database. The endpoint object calls the appropriate method in the appropriate IPOP accessor to morph the endpoint object from a skeletonized endpoint object into a full endpoint object (step 1014).

The appropriate IPOP accessor then prepares a database query statement to retrieve the data for the endpoint object from the appropriate database table (step 1016). The JDBC helpers execute the query statement against the endpoint table (step 1018), and the JDBC driver returns an iterator to the IPOP accessor with a resulting set of data, which matches the query for the requested endpoint (step 1020). The skeleton cache manager in the skeleton handler embedded within the IPOP accessor then copies the values of the endpoint object's attributes into the attributes that were dataless within the skeleton cache (step 1022); alternatively, the newly fetched endpoint object is merely stored within the skeleton cache. The skeleton cache manager then indicates that the endpoint object is a full object (step 1024), e.g., by setting a "notSkeleton" flag. The skeleton handler or IPOP accessor, whichever is appropriate for the execution flow in the particular implementation of the skeletonization mechanism, then returns control back to the endpoint object (step 1026). The method that was initially called within the endpoint object to obtain the requested attribute then returns the requested attribute to the requesting application (step 1028), and the process is complete.

Figure 11A:
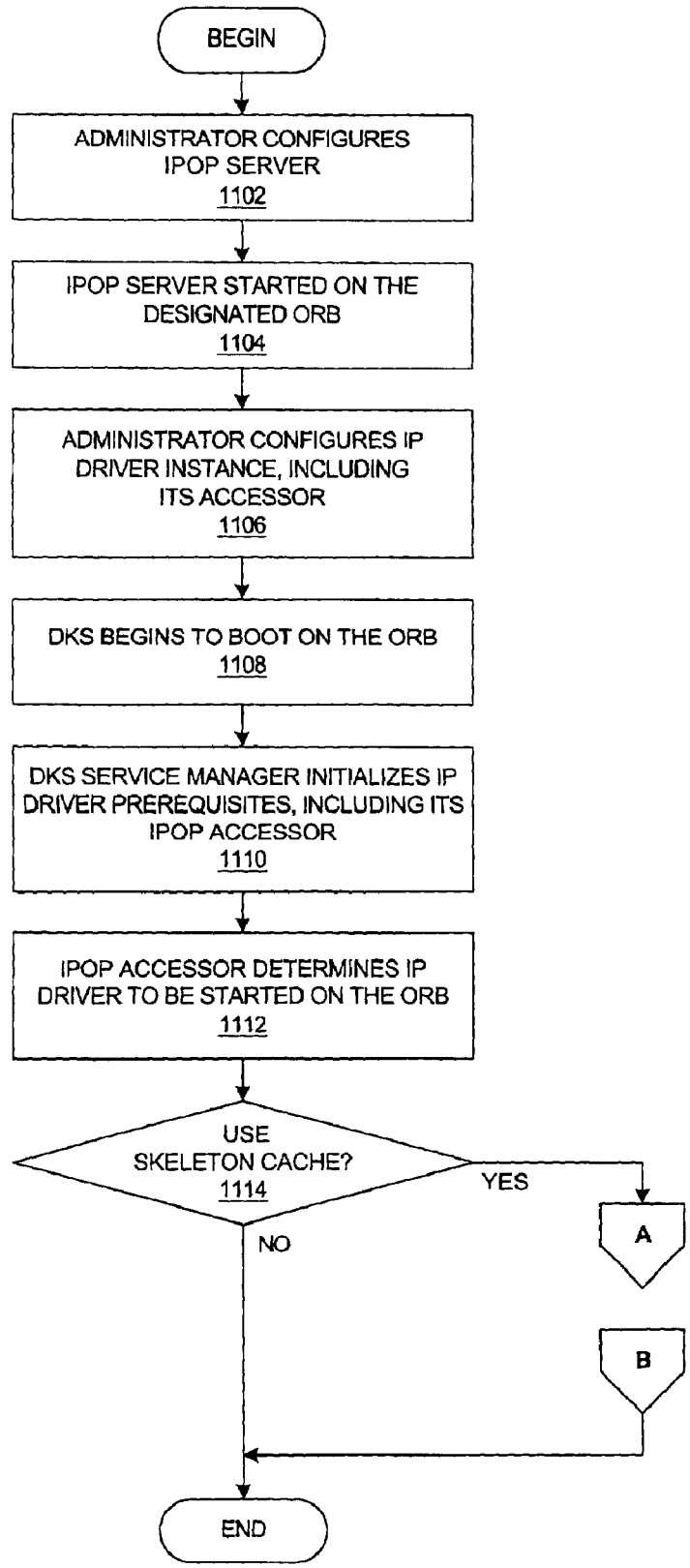
FIGS. 11A–11B are a pair of flowcharts depicting a process by which a network management framework employs a skeleton policy to implement a skeletonization mechanism in accordance with the present invention.
Figure 11B:
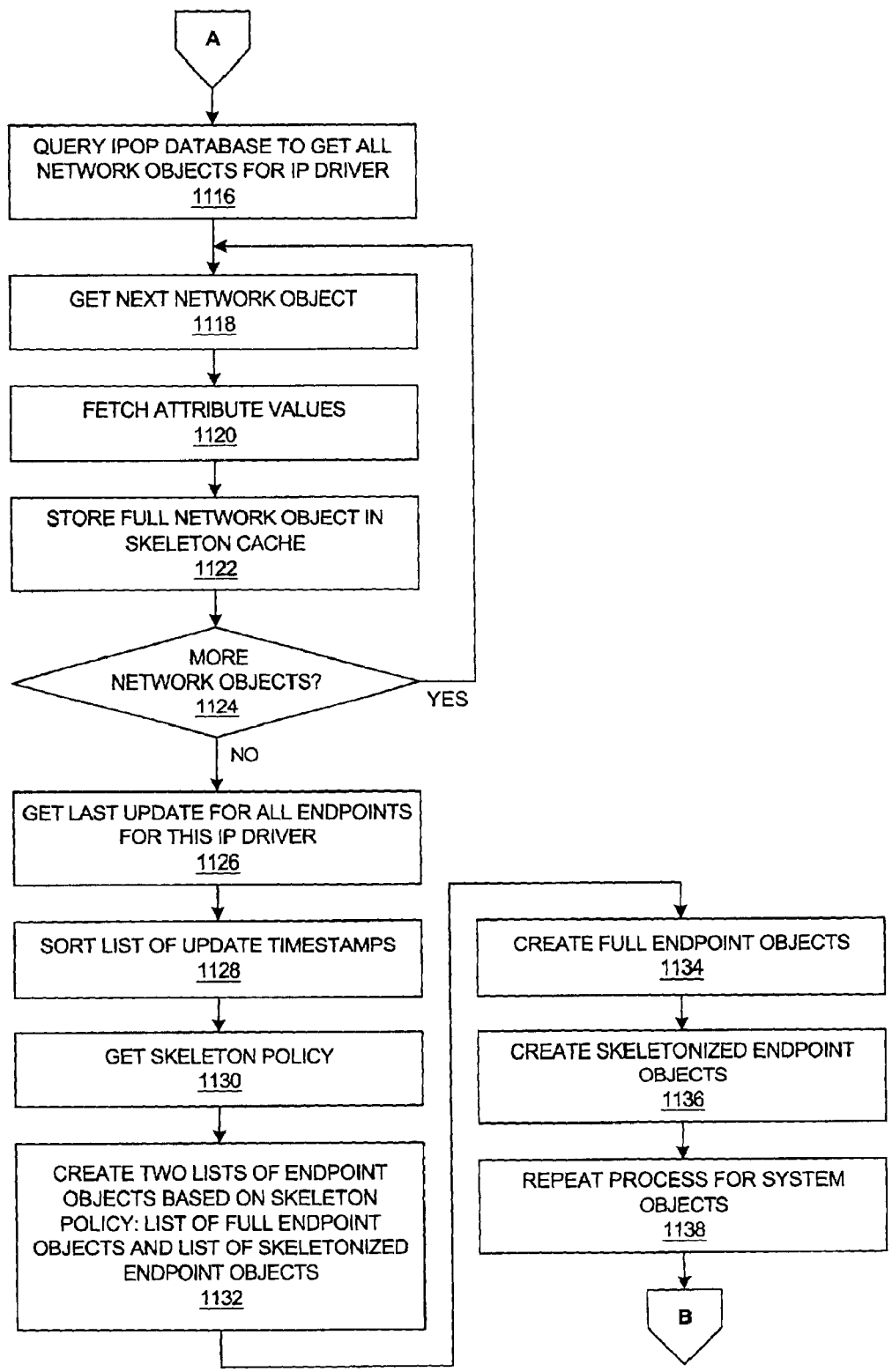

With reference now to FIGS. 11A–11B, a pair of flowcharts depicts a process by which a network management framework employs a skeleton policy to implement a skeletonization mechanism in accordance with the present invention. The process begins with an administrative user configuring an IPOP server to be deployed on a particular ORB (step 1102), after which the IPOP server is started on the designated ORB (step 1104). The administrator then configures the IP driver to be deployed on the ORB, including the IP driver discovery controller IPOP accessor (step 1106). The DKS network management framework begins to boot on the designated ORB (step 1108), and the DKS service manager initializes the IP driver prerequisites, which causes the IP driver discovery controller IPOP accessor to be started (step 1110). The IP driver discovery controller IPOP accessor reads the DKS service manager configuration data and determines the IP driver that will be started on the same ORB as the IP driver discovery controller IPOP accessor (step 1112). The skeleton handler within the IP driver discovery controller IPOP accessor then reads the configuration data in the IP driver discovery controller IPOP accessor's skeleton policy to determine whether a skeleton cache can and should be used to tune and improve the performance of the ORB, the network, or some other physical or logical structure within the distributed data processing system (step 1114). If not, then the process is complete as the skeleton handler has determined not to initialize and manage a skeleton cache.

If a skeleton cache is to be operated, then the skeleton handler can report this fact to the IP driver discovery controller IPOP accessor, which will then initiate processing to set up the skeleton cache. The appropriate size of the skeleton cache can be determined from configuration parameters and various conditions and system resources within the distributed data processing system. IP driver discovery controller IPOP accessor queries the IPOP database to get all of the network objects belonging to this IP driver (step 1116) then loops through each network object. As mentioned previously, in the preferred embodiment, full network objects are always stored within the skeleton cache.

A first or next network object is retrieved (step 1118), depending on the iteration through the loop. In the network table in the IPOP database, it may be assumed that the network objects are stored such that the network object instances are represented by a row in the network table, and each attribute within a network object is represented by a column in the network table. Hence, the IPOP accessor can fetch the attribute values for the network object column-by-column (step 1120). In any case, the IPOP accessor, via the skeleton cache manager, stores the full network object in the skeleton cache and marks the network object as being a non-skeleton, full object (step 1122). A determination is then made as to whether or not there are more network objects to be processed (step 1124), and if so, then the flowchart branches back to step 1118 to process another network object, but if not, then the process continues by processing endpoint objects.

The IPOP accessor (or the skeleton handler) then retrieves, for each endpoint object managed by this particular IP driver, a date and time, e.g., a timestamp value, associated with each endpoint and stored within the IPOP database that indicates the most recent update or retrieval for the endpoint from the IPOP database (step 1126). The list of timestamps are then sorted (step 1128).

The IPOP accessor, through the skeleton policy engine in the skeleton handler, gets the skeleton policy for this IP driver discover controller to determine the temporal policy for updating endpoint objects (step 1130). With reference to the skeleton policy, the IPOP accessor then creates a list of endpoints that should be stored in the skeleton cache as full endpoint objects and a list of endpoints that should be stored in the skeleton cache as skeletonized endpoint objects (step 1132). For each endpoint in the skeleton object list, a skeletonized endpoint object is created and values for full attributes are retrieved from the IPOP database and stored in the skeleton cache (step 1134). For each endpoint in the full object list, a full endpoint object is created, and the full endpoint object is retrieved from the IPOP database and stored in the skeleton cache (step 1136).

The IPOP accessor (or the skeleton handler) then repeats the process for the system objects that are managed by this particular IP driver (step 1138). After initializing the skeleton cache with full system objects and skeletonized system objects, the process is complete.

The advantages of the present invention should be apparent in view of the detailed description of the invention that is provided above. Representing each endpoint within a large distributed data processing system may require a very large number of objects; hence, a system with more than a million devices may require several million objects, and these objects need to be served to various requesters or consumers of the objects as quickly as possible yet without consuming all of the available RAM memory.

The present invention provides a flexible network management framework for discovering and monitoring endpoints within a distributed data processing system. A skeletonization mechanism adapts retrieval and caching operations with respect to a database so as to minimize the impact on system performance that is caused by those operations. In particular, performance adjustments occur dynamically in accordance with the current needs of the system management framework. The skeletonization mechanism can be configured so that its skeleton cache operates within a predetermined amount of memory, thereby conserving memory because only some objects and/or attributes of objects are represented in the skeleton cache as fully valued objects while other objects are represented in the skeleton cache as skeletonized objects. Because of the manner in which the skeleton cache is loaded, full objects are retrieved on an as-needed basis, and the burden on the communication infrastructure of the distributed data processing system is also balanced over a much longer period of time.

The skeletonization mechanism of the present invention allows data exchange between software components to occur in multiple fetches using a multi-layered storage organization that includes a skeleton cache. The manner in which a skeleton cache is managed may be guided by a skeleton policy with the following conditions. First, the skeleton may use historical factors by tracking the frequency of use of objects. In this case, the determination of whether or not to skeletonize a set of data objects is based on the likelihood that the value of the data will either be changed or be used.

Second, the skeleton policy may switch on or off the skeletonization mechanism such that it is always on or always off. For example, in the DKS network management framework, the network endpoint locator service must work with network objects on an on-going basis; therefore, it may have a policy in which network objects are never skeletonized but system objects and endpoint objects are routinely skeletonized.

Third, the availability of system resources can be used by a database accessor to setup a skeleton cache in accordance with configuration parameters. Since the database accessor has general assessor methods for various applications, i.e. it is a front-end to a back-end database, the amount of resources that to be used for a skeleton cache can be dynamically varied by the database accessor; the application that uses the database accessor and consumes the data from the database does not need to be informed of the skeletonization mechanism, which can be embedded within the database accessors while still presenting the same interface between the database accessor and the application. In this way, the performance can be tuned to adapt with the changing needs of a data-consuming application. For example, at any given time, an IP mapper may need full data objects for only a few endpoints, whereas an IP driver discover controller or an IP driver monitoring controller needs skeleton data for many endpoints; during the same time period, DKS network congestion may permit only a certain maximum amount of data to be transmitted, and a DKS ORB may permit only a certain maximum amount of memory to be used at that time.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing objects in a data processing system, the method comprising:

creating a skeleton cache;

storing a first object in the skeleton cache, wherein a skeleton cache stores skeleton objects and/or full objects, wherein a full object is an object in which each attribute within the full object has a data value, wherein a skeleton object is an object in which at least one attribute within the skeleton object is dataless, and wherein a skeleton object has a corresponding full object that is stored without the skeleton cache but within the data processing system; and retrieving a skeleton definition associated with the first object, wherein a skeleton definition is associated with a first object's type, wherein a skeleton definition indicates whether an attribute within the first object is a skeleton attribute, and wherein a skeleton attribute is a dataless attribute.

2. The method of claim 1 further comprising:

fetching a full object;

generating a skeleton object corresponding to the fetched full object;

determining whether a first attribute in the fetched full object is a full attribute or a skeleton attribute in accordance with the fetched full object's skeleton definition;

in response to a determination that the first attribute is a full attribute, copying the first attribute's data value from the fetched full object into the corresponding skeleton object; and storing the corresponding skeleton object in the skeleton cache.

3. The method of claim 1 further comprising:

requesting a value of a second attribute of a second object; and determining whether the second object resides in the skeleton cache as a full object or as a skeleton object.

4. The method of claim 3 further comprising:

in response to a determination that the second object resides in the skeleton cache as a full object, retrieving the requested value of the second attribute of the second object from the second object residing in the skeleton cache.

5. The method of claim 3 further comprising:

in response to a determination that the second object resides in the skeleton cache as a skeleton object, determining whether the second attribute in the second object is a full attribute or a skeleton attribute.

6. The method of claim 5 further comprising:

in response to a determination that the second attribute is a full attribute, retrieving the requested value of the second attribute of the second object from the second object residing in the skeleton cache.

7. The method of claim 5 further comprising:

in response to a determination that the second attribute is a skeleton attribute, retrieving the requested value of the second attribute of the second object from a corresponding full object for the second object stored within the data processing system.

8. The method of claim 1 further comprising:

determining whether to create a skeleton cache in accordance with a skeleton policy, wherein the skeleton policy comprises one or more configurable conditions for determining whether to create a skeleton cache.

9. The method of claim 8 wherein a configurable condition is based upon an identity of a user of the data processing system.

10. The method of claim 8 wherein a configurable condition is based upon a determination of membership of a user of the data processing system within a class of users.

11. The method of claim 8 wherein a configurable condition is based upon a determination of membership of a device for storing the skeleton cache within a class of devices.

12. The method of claim 8 wherein a configurable condition is based upon a determination of available memory.

13. The method of claim 8 wherein a configurable condition is based upon a determination of available memory within a device that stores the skeleton cache.

14. The method of claim 8 wherein a configurable condition is based upon a determination of available network bandwidth.

15. The method of claim 8 wherein a configurable condition is based upon a temporal evaluation of historical updates of objects stored within the data processing system.

16. The method of claim 1 further comprising:

providing a database access interface component between a data requester and a database; and embedding a skeleton handler within the database access interface component, wherein a skeleton handler performs operations on the skeleton cache on behalf of the database interface component.

17. The method of claim 16 further comprising:

configuring a skeleton policy for the database access interface component, wherein the skeleton policy comprises one or more configurable conditions for determining whether to create a skeleton cache.

18. An apparatus for managing objects in a data processing system, the apparatus comprising:

means for creating a skeleton cache;

means for storing a first object in the skeleton cache, wherein a skeleton cache stores skeleton objects and/or full objects, wherein a full object is an object in which each attribute within the full object has a data value, wherein a skeleton object is an object in which at least one attribute within the skeleton object is dataless, and wherein a skeleton object has a corresponding full object that is stored without the skeleton cache but within the data processing system; and means for retrieving a skeleton definition associated with the first object, wherein a skeleton definition is associated with a first object's type, wherein a skeleton definition indicates whether an attribute within the first object is a skeleton attribute, and wherein a skeleton attribute is a dataless attribute.

19. The apparatus of claim 18 further comprising:

means for fetching a full object;

means for generating a skeleton object corresponding to the fetched full object;

means for determining whether a first attribute in the fetched full object is a full attribute or a skeleton attribute in accordance with the fetched full object's skeleton definition;

means for copying the first attribute's data value from the fetched full object into the corresponding skeleton object in response to a determination that the first attribute is a full attribute; and means for storing the corresponding skeleton object in the skeleton cache.

20. The apparatus of claim 18 further comprising:

means for requesting a value of a second attribute of a second object; and means for determining whether the second object resides in the skeleton cache as a full object or as a skeleton object.

21. The apparatus of claim 20 further comprising:

means for retrieving the requested value of the second attribute of the second object from the second object residing in the skeleton cache in response to a determination that the second object resides in the skeleton cache as a full object.

22. The apparatus of claim 20 further comprising:

means for determining whether the second attribute in the second object is a full attribute or a skeleton attribute in response to a determination that the second object resides in the skeleton cache as a skeleton object.

23. The apparatus of claim 22 further comprising:

means for retrieving the requested value of the second attribute of the second object from the second object residing in the skeleton cache in response to a determination that the second attribute is a full attribute.

24. The apparatus of claim 22 further comprising:

means for retrieving the requested value of the second attribute of the second object from a corresponding full object for the second object stored within the data processing system in response to a determination that the second attribute is a skeleton attribute.

25. The apparatus of claim 18 further comprising:

means for determining whether to create a skeleton cache in accordance with a skeleton policy, wherein the skeleton policy comprises one or more configurable conditions for determining whether to create a skeleton cache.

26. The apparatus of claim 25 wherein a configurable condition is based upon an identity of a user of the data processing system.

27. The apparatus of claim 25 wherein a configurable condition is based upon a determination of membership of a user of the data processing system within a class of users.

28. The apparatus of claim 25 wherein a configurable condition is based upon a determination of membership of a device for storing the skeleton cache within a class of devices.

29. The apparatus of claim 25 wherein a configurable condition is based upon a determination of available memory.

30. The apparatus of claim 25 wherein a configurable condition is based upon a determination of available memory within a device that stores the skeleton cache.

31. The apparatus of claim 25 wherein a configurable condition is based upon a determination of available network bandwidth.

32. The apparatus of claim 25 wherein a configurable condition is based upon a temporal evaluation of historical updates of objects stored within the data processing system.

33. The apparatus of claim 18 further comprising:

means for providing a database access interface component between a data requester and a database; and means for embedding a skeleton handler within the database access interface component, wherein a skeleton handler performs operations on the skeleton cache on behalf of the database interface component.

34. The apparatus of claim 33 further comprising:

means for configuring a skeleton policy for the database access interface component, wherein the skeleton policy comprises one or more configurable conditions for determining whether to create a skeleton cache.

35. A computer program product on a computer readable medium for managing objects in a data processing system, the computer program product comprising:

instructions for creating a skeleton cache;

instructions for storing a first object in the skeleton cache, wherein a skeleton cache stores skeleton objects and/or full objects, wherein a full object is an object in which each attribute within the full object has a data value, wherein a skeleton object is an object in which at least one attribute within the skeleton object is dataless, and wherein a skeleton object has a corresponding full object that is stored without the skeleton cache but within the data processing system; and instructions for retrieving a skeleton definition associated with the first object, wherein a skeleton definition is associated with a first object's type, wherein a skeleton definition indicates whether an attribute within the first object is a skeleton attribute, and wherein a skeleton attribute is a dataless attribute.

36. The computer program product of claim 35 further comprising:

instructions for fetching a full object;

instructions for generating a skeleton object corresponding to the fetched full object;

instructions for determining whether a first attribute in the fetched full object is a full attribute or a skeleton attribute in accordance with the fetched full object's skeleton definition;

instructions for copying the first attribute's data value from the fetched full object into the corresponding skeleton object in response to a determination that the first attribute is a full attribute; and instructions for storing the corresponding skeleton object in the skeleton cache.

37. The computer program product of claim 35 further comprising:

instructions for determining whether to create a skeleton cache in accordance with a skeleton policy, wherein the skeleton policy comprises one or more configurable conditions for determining whether to create a skeleton cache.

* * * * *